(12) United States Patent
Ueki et al.

(10) Patent No.: US 10,221,916 B2
(45) Date of Patent: Mar. 5, 2019

(54) ANTI-VIBRATION APPARATUS

(71) Applicant: BRIDGESTONE CORPORATION, Tokyo (JP)

(72) Inventors: Akira Ueki, Tokyo (JP); Masakazu Nagasawa, Tokyo (JP); Kenichiro Iwasaki, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 2 days.

(21) Appl. No.: 14/894,574

(22) PCT Filed: Apr. 25, 2014

(86) PCT No.: PCT/JP2014/061702
§ 371 (c)(1),
(2) Date: Nov. 30, 2015

(87) PCT Pub. No.: WO2014/196284
PCT Pub. Date: Dec. 11, 2014

(65) Prior Publication Data
US 2016/0131219 A1 May 12, 2016

(30) Foreign Application Priority Data

Jun. 3, 2013 (JP) .................................. 2013-116892
Feb. 17, 2014 (JP) .................................. 2014-027649

(51) Int. Cl.
*F16F 13/10* (2006.01)
*B60K 5/12* (2006.01)
*F16F 13/08* (2006.01)

(52) U.S. Cl.
CPC .......... *F16F 13/107* (2013.01); *B60K 5/1208* (2013.01); *F16F 13/08* (2013.01)

(58) Field of Classification Search
CPC ...... F16F 13/262; F16F 13/264; F16F 13/105; F16F 13/26; F16F 13/107; F16F 13/266;
(Continued)

(56) References Cited

U.S. PATENT DOCUMENTS 4,618,128 A 10/1986 Hartel et al.
4,676,489 A 6/1987 Hofmann et al.
(Continued)

FOREIGN PATENT DOCUMENTS

CN 101460762 A 6/2009
CN 102803783 A 11/2012
(Continued)

OTHER PUBLICATIONS

International Search Report, issued by International Searching Authority in corresponding International Application No. PCT/JP2014/069356, dated Aug. 19, 2014.
(Continued)

*Primary Examiner* — Bradley T King
*Assistant Examiner* — Stephen M Bowes
(74) *Attorney, Agent, or Firm* — Sughrue Mion, PLLC

(57) ABSTRACT

An anti-vibration apparatus (10) includes a first attachment member (11) having a tubular shape and connected to one of a vibration generating section and a vibration receiving section and a second attachment member (12) connected to the other section, an elastic body (13) configured to connect the attachment members to each other, and a partition member (16) configured to partition a liquid chamber in the first attachment member (11) in which a liquid is sealed into a first liquid chamber (14) and a second liquid chamber (15). At least one of the first liquid chamber (14) and the second liquid chamber (15) has the elastic body (13) at a portion of a wall surface. An intermediate chamber disposed in the partition member (16), a first communication path config-
(Continued)

ured to bring the intermediate chamber and the first liquid chamber (14) in communication with each other and a second communication path configured to bring the intermediate chamber and the second liquid chamber (15) in communication with each other are formed at the partition member (16). An opening axis of a first opening section opened toward the inside of the intermediate chamber of the first communication path and an opening axis of a second opening section opened toward the inside of the intermediate chamber of the second communication path are offset from each other. At least one of the first opening section and the second opening section is opened toward the wall surface that defines the intermediate chamber. According to the anti-vibration apparatus (10), generation of strange noises can be suppressed while product characteristics are secured, and simplification of the structure and facilitation of the manufacture can be accomplished.

8 Claims, 9 Drawing Sheets

(58) Field of Classification Search
CPC .......... F16F 13/268; F16F 1/3935; F16F 1/41; F16F 13/106
See application file for complete search history.

(56) References Cited

U.S. PATENT DOCUMENTS

| | | | | |
|---|---|---|---|---|
| 4,739,962 A | * | 4/1988 | Morita | F16F 9/34 267/140.13 |
| 4,773,634 A | * | 9/1988 | Hamaekers | F16F 13/106 137/493 |
| 4,781,362 A | * | 11/1988 | Reuter | F16F 13/106 180/312 |
| 4,811,934 A | | 3/1989 | Bebermeier et al. | |
| 4,858,879 A | | 8/1989 | Miyamoto et al. | |
| 4,877,225 A | * | 10/1989 | Noguchi | F16F 13/262 267/140.14 |
| 4,903,951 A | * | 2/1990 | Miyamoto | F16F 13/105 267/140.13 |
| 5,273,262 A | | 12/1993 | Baldini et al. | |
| 5,346,192 A | | 9/1994 | Weltin et al. | |
| 5,398,917 A | | 3/1995 | Carlson et al. | |
| 5,601,280 A | | 2/1997 | Nagaya et al. | |
| 2003/0168789 A1 | | 9/2003 | Kries et al. | |
| 2009/0250852 A1 | | 10/2009 | Jones et al. | |
| 2009/0283945 A1 | | 11/2009 | Kojima et al. | |
| 2010/0072683 A1 | | 3/2010 | Saito et al. | |
| 2011/0006466 A1 | | 1/2011 | Ichikawa et al. | |
| 2011/0042870 A1 | | 2/2011 | Kojima | |
| 2012/0139174 A1 | | 6/2012 | Matsumoto et al. | |
| 2012/0292837 A1 | | 11/2012 | Hettler et al. | |

FOREIGN PATENT DOCUMENTS

| | | | | |
|---|---|---|---|---|
| CN | 202674148 U | | 1/2013 | |
| DE | 10 2010 048 259 A1 | | 5/2012 | |
| EP | 0137477 A2 | | 4/1985 | |
| EP | 0209682 A2 | | 1/1987 | |
| EP | 0848183 A2 | | 6/1998 | |
| EP | 2221503 A1 | | 8/2010 | |
| GB | 2242724 A | | 10/1991 | |
| GB | 2402457 A | * | 12/2004 | ............ F16F 1/3873 |
| JP | 60-40841 A | | 3/1985 | |
| JP | 60-73147 A | | 4/1985 | |
| JP | 60-159440 A | | 8/1985 | |
| JP | 60-164031 A | | 8/1985 | |
| JP | 6124560 U | | 2/1986 | |
| JP | 1224544 A | | 9/1989 | |
| JP | 2007-120598 A | | 5/2007 | |
| JP | 5014329 B2 | | 8/2012 | |

OTHER PUBLICATIONS

Hideki Yoshitomi. et al., "A Study on a Valveless Micro-Pump using Fluidic Diode", Tsuyama National College of Technology, 2007, pp. 9-15, No. 49.
International Search Report for PCT/JP2014/061702 dated Aug. 5, 2014 [PCT/ISA/210].
Communication dated Feb. 28, 2017, from the State Intellectual Property Office of People's Republic of China in counterpart Application No. 201480075555.0.
Response to the U.S. Office Action filed on Dec. 13, 2017 in U.S. Appl. No. 15/118,138.
Office Action dated Sep. 14, 2017 from U.S. Patent & Trademark Office in counterpart U.S. Appl. No. 15/118,138.

* cited by examiner

ANTI-VIBRATION APPARATUS

TECHNICAL FIELD

The present invention relates to an anti-vibration apparatus applied to, for example, an automobile, industrial machinery, or the like, and configured to absorb and attenuate vibrations of a vibration generating section such as an engine or the like.

This application is a National Stage of International Application No. PCT/JP2014/061702, filed on Apr. 25, 2014, which claims priority from Japanese Patent Application No. 2013-116892, filed Jun. 3, 2013 and Japanese Patent Application No. 2014-027649, filed Feb. 17, 2014, the contents of which are incorporated herein by reference.

BACKGROUND ART

As such an anti-vibration apparatus, for example, a configuration disclosed in the following Patent Document 1 is known. The anti-vibration apparatus includes a first attachment member having a tubular shape and connected to one of a vibration generating section and a vibration receiving section, a second attachment member connected to the other section, an elastic body configured to connect the attachment members to each other, a liquid chamber in the first attachment member in which a liquid is sealed, and a partition member which partitions the liquid chamber into a first liquid chamber and a second liquid chamber. The anti-vibration apparatus further includes a first restriction passage and a second restriction passage configured to bring the liquid chambers in communication with each other, a cylinder chamber installed between the liquid chambers, and a plunger member disposed in the cylinder chamber to be movable between an open position and a closed position.

A plurality of types of vibrations having different frequencies such as an idle vibration, a shake vibration, or the like, are input to the anti-vibration apparatus. Here, in the anti-vibration apparatus, resonant frequencies of the first restriction passage and the second restriction passage are set (tuned) to frequencies of different types of vibrations. Then, as the plunger member moves between the open position and the closed position according to the frequency of the input vibration, the restriction passage through which the liquid flows is switched to the first restriction passage and the second restriction passage.

CITATION LIST

Patent Document

[Patent Document 1] Japanese Unexamined Patent Application, First Publication No. 2007-120598

SUMMARY OF INVENTION

Technical Problem

However, in the anti-vibration apparatus of the related art, there is room for improvement in suppression of strange noise generated when the plunger member moves, simplification of a structure thereof, and facilitation of manufacture thereof.

In addition, in the anti-vibration apparatus of the related art, for example, when unintended vibrations such as micro vibrations or the like having a larger frequency and much smaller amplitude than a resonant frequency of the restriction passage are input, a dynamic spring constant is increased due to clogging or the like of the restriction passage. As a result, for example, influence on product characteristics of the anti-vibration apparatus such as ride comfort characteristics of an automobile may occur. Further, the resonant frequency of the restriction passage is determined by a path length, a cross-sectional area, or the like of the restriction passage.

In consideration of the above-mentioned circumstances, the present invention is directed to provide an anti-vibration apparatus capable of suppressing the generation of strange noises while securing product characteristics, and simplifying a structure thereof and facilitating manufacture thereof.

Solution to Problem

An anti-vibration apparatus according to an aspect of the present invention includes a first attachment member having a tubular shape and connected to one of a vibration generating section and a vibration receiving section, and a second attachment member connected to the other section; an elastic body configured to connect the attachment members to each other; and a partition member configured to partition a liquid chamber in the first attachment member in which a liquid is sealed into a first liquid chamber and a second liquid chamber. At least one of the first liquid chamber and the second liquid chamber has the elastic body at a portion of a wall surface. An intermediate chamber disposed in the partition member, a first communication path configured to bring the intermediate chamber and the first liquid chamber in communication with each other, and a second communication path configured to bring the intermediate chamber and the second liquid chamber in communication with each other are formed at the partition member. An opening axis of a first opening section opened toward the inside of the intermediate chamber of the first communication path and an opening axis of a second opening section opened toward the inside of the intermediate chamber of the second communication path are offset from each other. At least one of the first opening section and the second opening section is opened toward the wall surface that defines the intermediate chamber.

In this case, when the vibrations are input, the first attachment member and the second attachment member are relatively displaced to each other while elastically deforming the elastic body. Then, the liquid flows through the first communication path, the intermediate chamber and the second communication path between the first liquid chamber and the second liquid chamber.

Here, when the liquid flows into the intermediate chamber from the opening section opened toward the wall surface that defines the intermediate chamber in the first opening section and the second opening section, if a flow velocity of the liquid is increased, the liquid linearly advances through the intermediate chamber to reach the wall surface. Then, a flow of the liquid is varied along the wall surface, and the liquid reaches the other opening section to flow out of the intermediate chamber.

When the flow velocity of the liquid flowing into the intermediate chamber is low, the liquid is suppressed from linearly advancing from the opening section, and passes through a short path in the intermediate chamber.

According to the anti-vibration apparatus, when the flow velocity of the liquid flowing through the intermediate chamber is increased, the liquid can flow through the long path to generate friction between the liquid and the wall surface of the intermediate chamber. Accordingly, a great amount of energy can be lost, the pressure loss of the liquid can be increased, and the vibrations can be absorbed and attenuated. In this way, in the anti-vibration apparatus, as the pressure loss of the liquid is increased according to the flow velocity of the liquid flowing through the intermediate chamber is increased, the vibrations can be absorbed and attenuated. As a result, for example, when the conventional vibrations such as idle vibrations, shake vibrations, or the like, are input, regardless of the frequency of the vibrations, the vibrations can be absorbed and attenuated. Accordingly, generation of strange noises can be suppressed while a plurality of types of vibrations having different frequencies are absorbed and attenuated, and simplification of the structure and facilitation of the manufacture can be accomplished.

In addition, when the flow velocity of the liquid flowing through the intermediate chamber is low, the liquid can pass through the short path in the intermediate chamber, and occurrence of friction between the liquid and the wall surface of the intermediate chamber can be suppressed. Accordingly, the liquid can smoothly pass through the intermediate chamber to suppress the pressure loss of the liquid, and an increase in a dynamic spring constant can be suppressed. Accordingly, for example, when the flow velocity of the liquid is lower than when the conventional vibrations are input, for example, when unintentional vibrations such as micro vibrations or the like having a higher frequency and extremely smaller amplitude than the conventional vibrations are input, an increase in the dynamic spring constant can be suppressed. As a result, product characteristics of the anti-vibration apparatus can be easily secured.

In addition, a restriction passage formed independently from the intermediate chamber, the first communication path and the second communication path and configured to bring the first liquid chamber and the second liquid chamber in communication with each other may be formed at the partition member.

In this case, when the flow velocity of the liquid flowing through the intermediate chamber upon input of the vibrations is increased and the pressure loss of the liquid is increased, a flow resistance of the liquid passing through the first communication path, the intermediate chamber and the second communication path is increased. As a result, the liquid actively flows through the restriction passage between the first liquid chamber and the second liquid chamber. Here, as the resonance occurs in the restriction passage, the input vibration can be further absorbed and attenuated.

In this way, for example, when the conventional vibrations are input, the vibrations can be absorbed and attenuated by not only the pressure loss of the liquid but also the resonance in the restriction passage. Accordingly, the vibrations can be effectively absorbed and attenuated.

Further, an anti-vibration apparatus according to another aspect of the present invention includes a first attachment member having a tubular shape and connected to one of a vibration generating section and a vibration receiving section, and a second attachment member connected to the other section; an elastic body configured to connect the attachment members to each other; and a partition member configured to partition a liquid chamber in the first attachment member in which a liquid is sealed into a first liquid chamber and a second liquid chamber. At least one of the first liquid chamber and the second liquid chamber has the elastic body at a portion of the wall surface. A vortex chamber configured to come in communication with one of the liquid chambers through the rectification path and come in communication with the other liquid chamber through the communication hole is formed at the partition member. The rectification path is opened in a circumferential direction of the vortex chamber from the outer surface exposed to the one liquid chamber toward the inside of the vortex chamber in the partition member. The vortex chamber forms a swirl flow of the liquid according to the flow velocity of the liquid flowing from the rectification path and discharges the liquid from the communication hole.

Further, an anti-vibration apparatus according to another aspect of the present invention includes a first attachment member having a tubular shape and connected to one of a vibration generating section and a vibration receiving section, and a second attachment member connected to the other section; an elastic body configured to connect the attachment members to each other; and a partition member configured to partition a liquid chamber in the first attachment member in which a liquid is sealed into a first liquid chamber and a second liquid chamber. At least one of the first liquid chamber and the second liquid chamber has the elastic body at a portion of the wall surface. A communication chamber configured to bring the first liquid chamber and the second liquid chamber in communication with each other is formed at the partition member. Communication holes opened toward the communication chamber are separately formed in the first wall surface and the second wall surface opposite to each other with the communication chamber sandwiched therebetween in the wall surfaces that form the communication chamber in the partition member. As the communication holes, a first communication hole formed in the first wall surface and configured to bring the communication chamber and the first liquid chamber in communication with each other and a second communication hole formed in the second wall surface and configured to bring the communication chamber and the second liquid chamber in communication with each other are provided. The first communication hole and the second communication hole are disposed to be deviated in an orthogonal direction perpendicular to a facing direction in which the first wall surface and the second wall surface face each other. The first communication hole is formed by the inside of the first protrusion tube protruding from the first wall surface toward the inside of the communication chamber.

Advantageous Effects of Invention

According to the anti-vibration apparatus of the present invention, generation of strange noise can be suppressed while product characteristics are secured, and simplification of a structure thereof and facilitation of manufacture thereof can be accomplished.

DESCRIPTION OF EMBODIMENTS (First Embodiment)

Hereinafter, a first embodiment of an anti-vibration apparatus according to the present invention will be described with reference to FIGS. 1 and 2.

Figure 1:
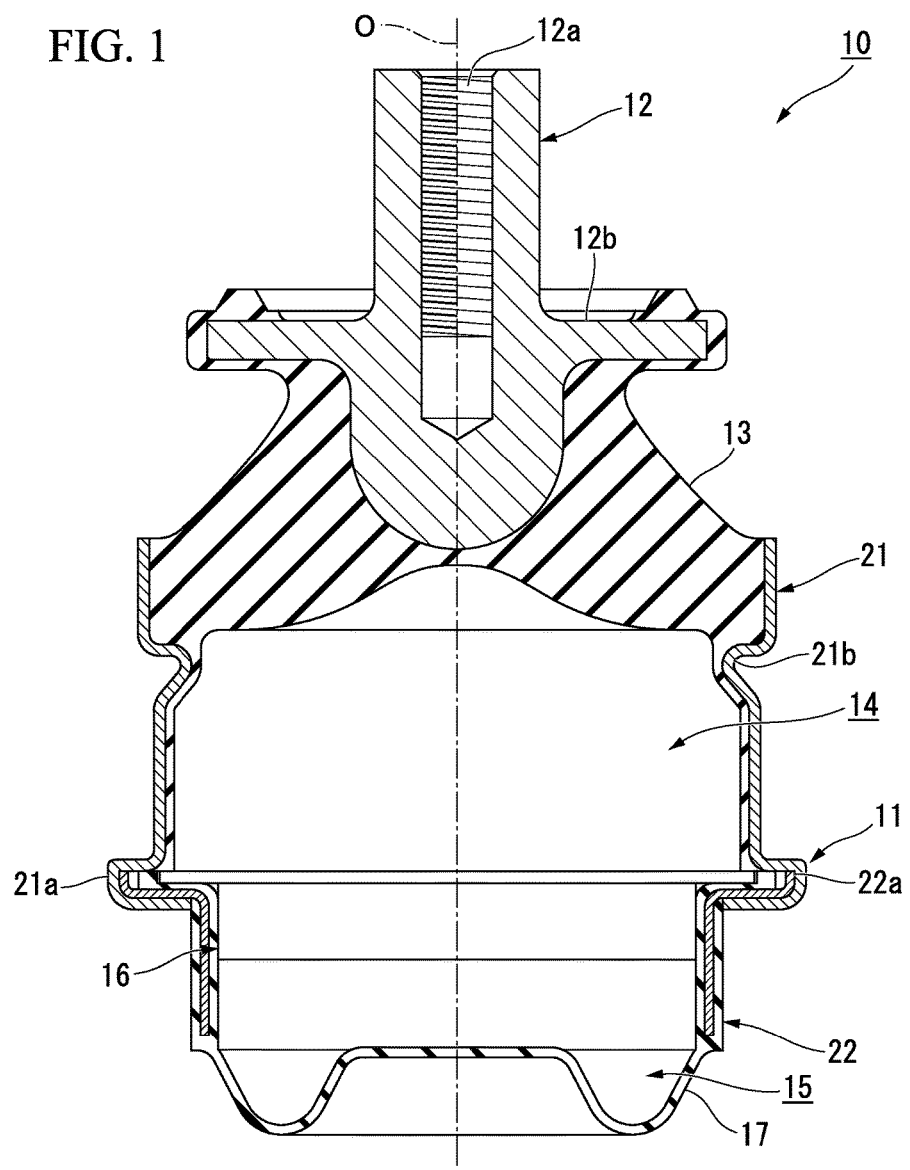
FIG. 1 is a longitudinal cross-sectional view of an anti-vibration apparatus according to a first embodiment of the present invention when a partition member is seen from a side view.
Figure 2:
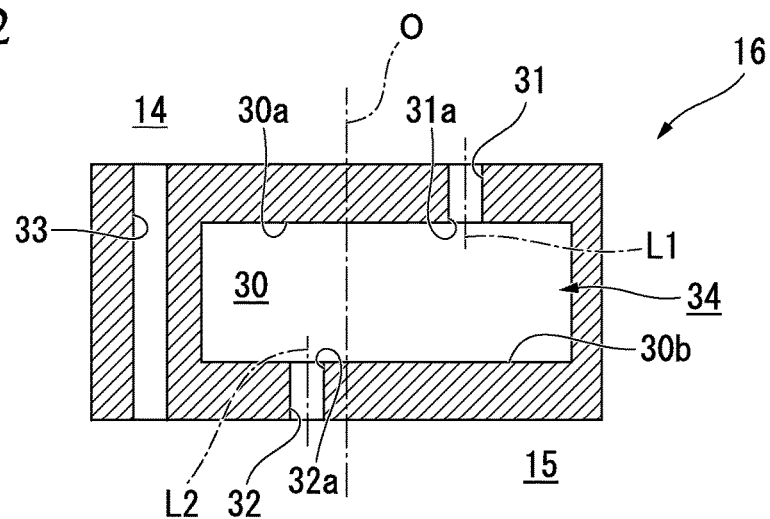
FIG. 2 is a schematic longitudinal cross-sectional view showing the partition member that constitutes the anti-vibration apparatus shown in FIG. 1.

As shown in FIG. 1, an anti-vibration apparatus 10 includes a first attachment member 11 having a tubular shape and connected to any one of a vibration generating section and a vibration receiving section, a second attachment member 12 connected to the other section, an elastic body 13 configured to connect the attachment members 11 and 12 to each other, and a partition member 16 configured to partition a liquid chamber in the first attachment member 11 in which a liquid is sealed into a main liquid chamber (a first liquid chamber) 14 having the elastic body 13 at a portion of a wall surface and a subsidiary liquid chamber (a second liquid chamber) 15.

In the example shown, the second attachment member 12 is formed in a columnar shape, the elastic body 13 is formed in a tubular shape, and the first attachment member 11, the second attachment member 12 and the elastic body 13 are disposed coaxially with a common axis. Hereinafter, the common axis is referred to as an axis (an axis of a first attachment member) O, the main liquid chamber 14 side in the axis O direction is referred to as one side, the subsidiary liquid chamber 15 side is referred to as the other side, a direction perpendicular to the axis O is referred to as a radial direction, and a direction of rotation about the axis O is referred to a circumferential direction.

Further, when the anti-vibration apparatus 10 is mounted on, for example, an automobile, the second attachment member 12 is connected to an engine serving as a vibration generating section, and the first attachment member 11 is attached to a vehicle body serving as a vibration receiving section via a bracket (not shown) to suppress transmission of vibrations of the engine to the vehicle body. The anti-vibration apparatus 10 is a liquid sealing type in which a liquid L such as ethylene glycol, water, silicone oil, or the like, is sealed in the liquid chamber of the first attachment member 11.

The first attachment member 11 includes one side outer tubular body 21 disposed at one side in the axis O direction, and the other side outer tubular body 22 disposed at the other side.

The elastic body 13 is connected to an end section of the one side of the one side outer tubular body 21 in a liquid-tight state, and an opening section of the one side of the one side outer tubular body 21 is closed by the elastic body 13. In the one side outer tubular body 21, an end section 21a of the other side has a larger diameter than the other portion. Then, the inside of the one side outer tubular body 21 becomes the main liquid chamber 14. A liquid pressure of the main liquid chamber 14 is varied as the elastic body 13 is deformed and an internal volume of the main liquid chamber 14 is changed upon input of vibrations. Further, in the one side outer tubular body 21, an annular groove 21b continuously extending throughout the entire circumference is formed at a portion continued from the other side with respect to a portion to which the elastic body 13 is connected.

A diaphragm 17 is connected to the end section of the other side of the other side outer tubular body 22 in a liquid-tight state, and an opening section of the other side of the other side outer tubular body 22 is closed by the diaphragm 17. In the other side outer tubular body 22, an end section 22a of the one side has a larger diameter than the other portion, and is fitted into the end section 21a of the other side of the one side outer tubular body 21. In addition, the partition member 16 is fitted into the other side outer tubular body 22, a portion in the other side outer tubular body 22 disposed between the partition member 16 and the diaphragm 17 becomes the subsidiary liquid chamber 15. The subsidiary liquid chamber 15 has the diaphragm 17 at a portion of the wall surface, and expands or contracts as the diaphragm 17 is deformed. Further, the other side outer tubular body 22 is covered by a rubber membrane integrally formed with the diaphragm 17 throughout substantially the entire region.

A female screw section 12a is formed in an end surface of the one side of the second attachment member 12 coaxially with the axis O. The second attachment member 12 protrudes from the first attachment member 11 toward the one side. A flange section 12b protruding outward in the radial direction and continuously extending throughout the entire circumference is formed at the second attachment member 12. The flange section 12b is separated from an edge of the one side of the first attachment member 11 toward the one side.

The elastic body 13 is formed of a rubber material or the like that is elastically deformable, and formed in a tubular shape having a diameter gradually increased from the one side toward the other side. In the elastic body 13, the end section of the one side is connected to the second attachment member 12, and the end section of the other side is connected to the first attachment member 11. Further, an inner circumferential surface of the one side outer tubular body 21 of the first attachment member 11 is covered by a rubber membrane integrally formed with the elastic body 13 throughout substantially the entire region.

The partition member 16 is fitted into the first attachment member 11. As shown in FIG. 2, an intermediate chamber 30, a first communication path 31, a second communication path 32 and a restriction passage 33 are formed in the partition member 16.

The intermediate chamber 30 is disposed in the partition member 16. The intermediate chamber 30 is formed in a flat columnar shape extending in the axis O direction. A flow path cross-sectional area of the intermediate chamber 30 which is served as a cross-sectional area perpendicular to the axis O direction is constant throughout its entire length in the axis O direction. A first wall surface 30a and a second wall surface 30b opposite to each other with the intermediate chamber 30 sandwiched therebetween are formed at wall surfaces that define the intermediate chamber 30. The first wall surface 30a and the second wall surface 30b are opposite to each other in the axis O direction. The first wall surface 30a is directed toward the other side and the second wall surface 30b is directed toward the one side.

The first communication path 31 brings the intermediate chamber 30 and the main liquid chamber 14 in communication with each other, and the second communication path 32 brings the intermediate chamber 30 and the subsidiary liquid chamber 15 in communication with each other. The first communication path 31 and the second communication path 32 are formed in the same number, and in the example shown, the first communication path 31 and the second communication path 32 are formed one to one. The first communication path 31 and the second communication path 32 are formed in the same shape and with the same size.

The first communication path 31 and the second communication path 32 linearly extend in the axis O direction. A flow path cross-sectional area of the first communication path 31 is constant throughout its entire length in a flow path axis direction of the first communication path 31, and a flow path cross-sectional area of the second communication path 32 is constant throughout its entire length in a flow path axis direction of the second communication path 32. The first communication path 31 extends from the first wall surface 30a toward the one side to be opened in the main liquid chamber 14, and the second communication path 32 extends from the second wall surface 30b toward the other side to be opened in the subsidiary liquid chamber 15.

An opening axis (hereinafter, referred to as a "first opening axis") L1 of a first opening section 31a opened toward the inside of the intermediate chamber 30 in the first communication path 31 and an opening axis (hereinafter, referred to as a "second opening axis") L2 of a second opening section 32a opened toward the inside of the intermediate chamber 30 in the second communication path 32 are offset to each other. Both the first opening axis L1 and the second opening axis L2 extend in the axis O direction and are offset to each other in the radial direction. The first opening axis L1 and the second opening axis L2 are non-coaxially disposed.

At least one of the first opening section 31a and the second opening section 32a is opened toward the wall surface that defines the intermediate chamber 30. In the embodiment, both of the first opening section 31a and the second opening section 32a are individually opened toward the wall surfaces that define the intermediate chamber 30. The liquid is filled in the intermediate chamber 30, for example, another element such as a membrane or the like is not received therein, and the first opening section 31a and the second opening section 32a are directly opened toward the wall surfaces that define the intermediate chamber 30, respectively. That is, the first opening section 31a and the second opening section 32a are directly opposite to the wall surfaces that define the intermediate chamber 30, respectively.

The first opening section 31a is opened toward the second wall surface 30b, and in the example shown, the first opening section 31a is directly opened toward the second wall surface 30b as a whole. The second opening section 32a is opened toward the first wall surface 30a, and in the example shown, the second opening section 32a is directly opened toward the first wall surface 30a as a whole.

Here, the intermediate chamber 30, the first communication path 31 and the second communication path 32 constitute a communication section 34 formed at the partition member 16 and configured to bring the main liquid chamber 14 and the subsidiary liquid chamber 15 in communication with each other. In the communication section 34, S1/S0 serving as a ratio between a flow path cross-sectional area S1 of the first communication path 31 and a flow path cross-sectional area S0 of the intermediate chamber 30 and S2/S0 serving as a ratio between a flow path cross-sectional area S2 of the second communication path 32 and the flow path cross-sectional area S0 of the intermediate chamber 30 are, for example, 1/50 to 1/2, respectively.

The restriction passage 33 is independently formed at the partition member 16 from the communication section 34. A flow path cross-sectional area of the restriction passage 33 is constant throughout its entire length in the flow path axis direction of the restriction passage 33. A resonant frequency of the restriction passage 33 is equal to a frequency of the vibrations (hereinafter, referred to as "conventional vibrations) that is generally input into the anti-vibration apparatus 10, and the restriction passage 33 generates a resonance (a liquid column resonance) with respect to the input of the general vibrations. As the conventional vibrations (the first vibrations), for example, there are shake vibrations (for example, a frequency is 14 Hz or less, and an amplitude is larger than ±0.5 mm), idle vibrations (for example, a frequency is 18 Hz to 30 Hz, and an amplitude is ±0.5 mm or less) having a frequency larger than the shake vibrations and an amplitude smaller than the shake vibrations, or the like.

A resonant frequency of the restriction passage 33 is also smaller than the resonant frequency of the first communication path 31 or the resonant frequency of the second communication path 32. The resonant frequencies of the first communication path 31 and the second communication path 32 are equal to each other. The resonant frequencies of the first communication path 31 and the second communication path 32 are equal to a frequency of unintended vibrations (second vibrations) such as micro vibrations having a frequency larger than the above-mentioned conventional vibrations and an amplitude significantly smaller than the above-mentioned conventional vibrations. The resonant frequencies of the first communication path 31, the second communication path 32 and the restriction passage 33 are determined based on, for example, flow path lengths, flow path cross-sectional areas, or the like, thereof.

Here, the communication section 34 facilitates the liquid to primarily flow therethrough rather than the restriction passage 33 immediately after the conventional vibrations are input into the anti-vibration apparatus 10. The above-mentioned configuration can be realized by, for example, adjusting the flow path lengths, the flow path cross-sectional areas, or the like, of the restriction passage 33 and the communication section 34.

Next, an action of the anti-vibration apparatus 10 will be described.

When the vibrations in the axis O direction are input from the vibration generating section into the anti-vibration apparatus 10, both of the attachment members 11 and 12 are relatively displaced to each other while elastically deforming the elastic body 13 to vary the liquid pressure of the main liquid chamber 14. Then, the liquid reciprocates between the main liquid chamber 14 and the subsidiary liquid chamber 15. Here, in the embodiment, the liquid primarily reciprocates through the communication section 34 rather than the restriction passage 33. Here, among the conventional vibrations, the idle vibrations have a relatively small amplitude and a high frequency, and the shake vibrations have a low frequency and a large amplitude. Accordingly, when the above-mentioned conventional vibrations are input, the flow velocity of the liquid introduced into the intermediate chamber 30 of the communication section 34 is increased to a certain level or more.

Then, when the flow velocity of the liquid flowing into the intermediate chamber 30 from the main liquid chamber 14 through the first communication path 31, the liquid flowing into the intermediate chamber 30 from the first opening section 31a linearly advances in the intermediate chamber 30 in the axis O direction (the first opening axis L1 direction) to arrive at the second wall surface 30b. Then, the flow of the liquid is varied along the second wall surface 30b, and the liquid arrives at the second opening section 32a to flow out of the intermediate chamber 30. Here, due to energy loss caused by generation of friction between the liquid and the wall surfaces of the intermediate chamber 30 through the long path in the intermediate chamber 30 through which the liquid flows, a viscous resistance of the liquid, or the like and a pressure loss of the liquid are increased, and the vibrations are absorbed and attenuated.

In addition, when the flow velocity of the liquid flowing into the intermediate chamber 30 from the subsidiary liquid chamber 15 through the second communication path 32 is increased, the liquid flowing into the intermediate chamber 30 from the second opening section 32a linearly advances in the intermediate chamber 30 in the axis O direction (the second opening axis L2 direction) to arrive at the first wall surface 30a. Then, the flow of the liquid is varied along the first wall surface 30a, and the liquid arrives at the first opening section 31a to flow out of the intermediate chamber 30. Here, due to energy loss caused by generation of friction between the liquid and the wall surfaces of the intermediate chamber 30 through the long path in the intermediate chamber 30 through which the liquid passes, a viscous resistance of the liquid, or the like and a pressure loss of the liquid are increased, and the vibrations are absorbed and attenuated.

In addition, when the pressure loss of the liquid is increased as described above, a flow resistance of the liquid flowing through the communication section 34 is increased. As a result, the liquid actively flows through the restriction passage 33 between the main liquid chamber 14 and the subsidiary liquid chamber 15. Here, as the resonance occurs in the restriction passage 33, the input vibrations are further absorbed and attenuated.

For example, the micro vibrations or the like having a higher frequency and a significantly smaller amplitude than estimated values may be unintentionally input into the anti-vibration apparatus 10. When the unintended vibrations such as the micro vibrations or the like are input, the flow velocity of the liquid flowing into the intermediate chamber 30 is decreased. Then, the liquid flowing into the intermediate chamber 30 is suppressed from linearly advancing in the axis O direction to pass through the intermediate chamber 30 via a short path. As a result, the pressure loss of the above-mentioned liquid is suppressed, the liquid flows through the intermediate chamber 30 to smoothly flow between the main liquid chamber 14 and the subsidiary liquid chamber 15, and thus, an increase in the dynamic spring constant is suppressed.

As described above, according to the anti-vibration apparatus 10 of the embodiment, when the flow velocity of the liquid flowing through the intermediate chamber 30 is increased, the liquid can pass through the long path to generate friction between the liquid and the wall surfaces of the intermediate chamber 30. Accordingly, the energy is largely lost, the pressure loss of the liquid may be increased, and the vibrations can be absorbed and attenuated. In this way, in the anti-vibration apparatus 10, as the pressure loss of the liquid is increased according to the flow velocity of the liquid flowing through the intermediate chamber 30, the vibrations can be absorbed and attenuated. As a result, for example, when the conventional vibrations such as the idle vibrations, the shake vibrations, or the like, are input, the vibration can be absorbed and attenuated regardless of the frequency of the vibrations. Accordingly, generation of strange noises can be suppressed while absorbing and attenuating a plurality of types of vibrations having different frequencies, and simplification of the structure and facilitation of manufacture can be accomplished.

Moreover, for example, when the conventional vibrations are input, the vibrations can be absorbed and attenuated by not only the pressure loss of the liquid but also the resonance in the restriction passage 33. Accordingly, the vibrations can be effectively absorbed and attenuated.

In addition, when the flow velocity of the liquid flowing through the intermediate chamber 30 is low, the liquid passes through the short path in the intermediate chamber 30, and generation of friction between the liquid and the wall surfaces of the intermediate chamber 30 can be suppressed. Accordingly, the pressure loss of the liquid can be suppressed by smoothly passing the liquid through the intermediate chamber 30, and an increase in the dynamic spring constant can be suppressed. Accordingly, for example, when the flow velocity of the liquid is lower than when the conventional vibrations are input, for example, when the unintended vibrations such as the micro vibrations having a higher frequency and significantly smaller amplitude than the conventional vibrations, or the like, are input, an increase in the dynamic spring constant can be suppressed. As a result, product characteristics of the anti-vibration apparatus 10 can be easily secured.

(Second Embodiment)

Figure 3:
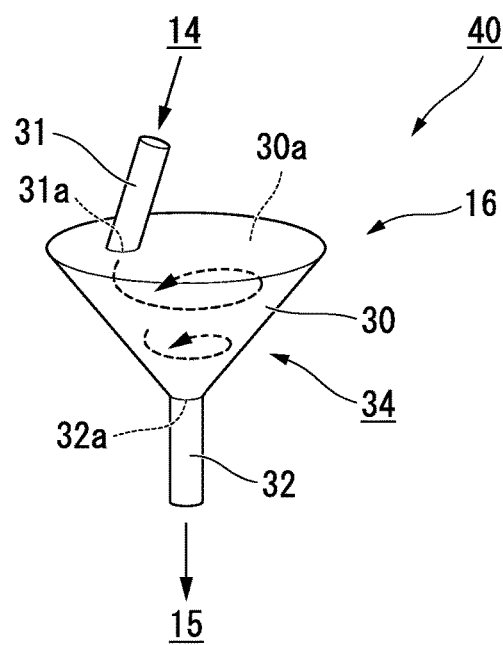
FIG. 3 is a schematic perspective view of a major part of an anti-vibration apparatus according to a second embodiment of the present invention.

Hereinafter, a second embodiment of an anti-vibration apparatus according to the present invention will be described with reference to FIG. 3.

Further, in the second embodiment, the same components as the first embodiment are designated by the same reference numerals, description thereof will be omitted, and only differences from the first embodiment will be described.

In an anti-vibration apparatus 40 of the embodiment, the intermediate chamber 30 is formed in a conical shape instead of a flat columnar shape. A flow path cross-sectional area of the intermediate chamber 30 is gradually reduced from one side toward the other side in the axis O direction.

An end section of the other side in the axis O direction of the intermediate chamber 30 is directly connected to the second communication path 32, and the second communication path 32 extends in a linear shape from the end section of the other side in the axis O direction of the intermediate chamber 30 toward the other side. The second communication path 32 is disposed coaxially with the axis O, and the second opening section 32a is opened toward the first wall surface 30a of the wall surfaces that define the intermediate chamber 30.

The first communication path 31 extends in a direction inclined with respect to the axis O, and the first opening section 31a is disposed to avoid a portion of the first wall surface 30a opposite to the second opening section 32a in the axis O direction. The first opening section 31a is opened toward an inner circumferential surface of the wall surfaces that define the intermediate chamber 30.

Next, an operation of the anti-vibration apparatus 40 will be described.

When vibrations in the axis O direction are input into the anti-vibration apparatus 40 from the vibration generating section, both of the attachment members 11 and 12 are relatively displaced to each other while elastically deforming the elastic body 13 to vary a liquid pressure of the main liquid chamber 14. Then, the liquid flows back and forth between the main liquid chamber 14 and the subsidiary liquid chamber 15 through the communication section 34.

When the conventional vibrations are input into the anti-vibration apparatus 40 and the liquid in the main liquid chamber 14 flows into the intermediate chamber 30, if the flow velocity of the liquid is increased, the liquid flowing into the intermediate chamber 30 from the first opening section 31a linearly advances through the intermediate chamber 30 in an opening direction of the first opening section 31a to reach the inner circumferential surface of the intermediate chamber 30. Then, the flow of the liquid is varied along the inner circumferential surface of the intermediate chamber 30, and the liquid flows toward the other side while forming a spiral shape in the circumferential direction to reach the second opening section 32a to flow out of the intermediate chamber 30. Here, due to energy loss or the like caused by the flow of the liquid in the intermediate chamber 30 through the long path and generation of friction between the liquid and the wall surfaces of the intermediate chamber 30, pressure loss of the liquid is increased and the vibrations are absorbed and attenuated.

When the unintended vibrations such as micro vibrations or the like are input and the flow velocity of the liquid flowing into the intermediate chamber 30 is decreased, the liquid flowing into the intermediate chamber 30 from the first opening section 31a is suppressed from linearly advancing in the opening direction of the first opening section 31a to pass through the short path in the intermediate chamber 30. As a result, since the above-mentioned pressure loss of the liquid is suppressed and the liquid passes through the intermediate chamber 30 to smoothly flow between the main liquid chamber 14 and the subsidiary liquid chamber 15, an increase in the dynamic spring constant is suppressed.

Further, in the first embodiment and the second embodiment, the inside of the first communication path 31 or the inside of the second communication path 32 may be closed by a film body elastically deformed by the liquid pressure of the liquid such as an elastic thin film or the like. Even in this case, as the liquid pressure of the liquid disposed at both sides with the film body sandwiched therebetween is transmitted via the film body, the liquid flows through the inside of the first communication path 31 or the inside of the second communication path 32.

(Third Embodiment)

Hereinafter, a third embodiment of the anti-vibration apparatus according to the present invention will be described with reference to FIGS. 4 to 9.

Figure 4:
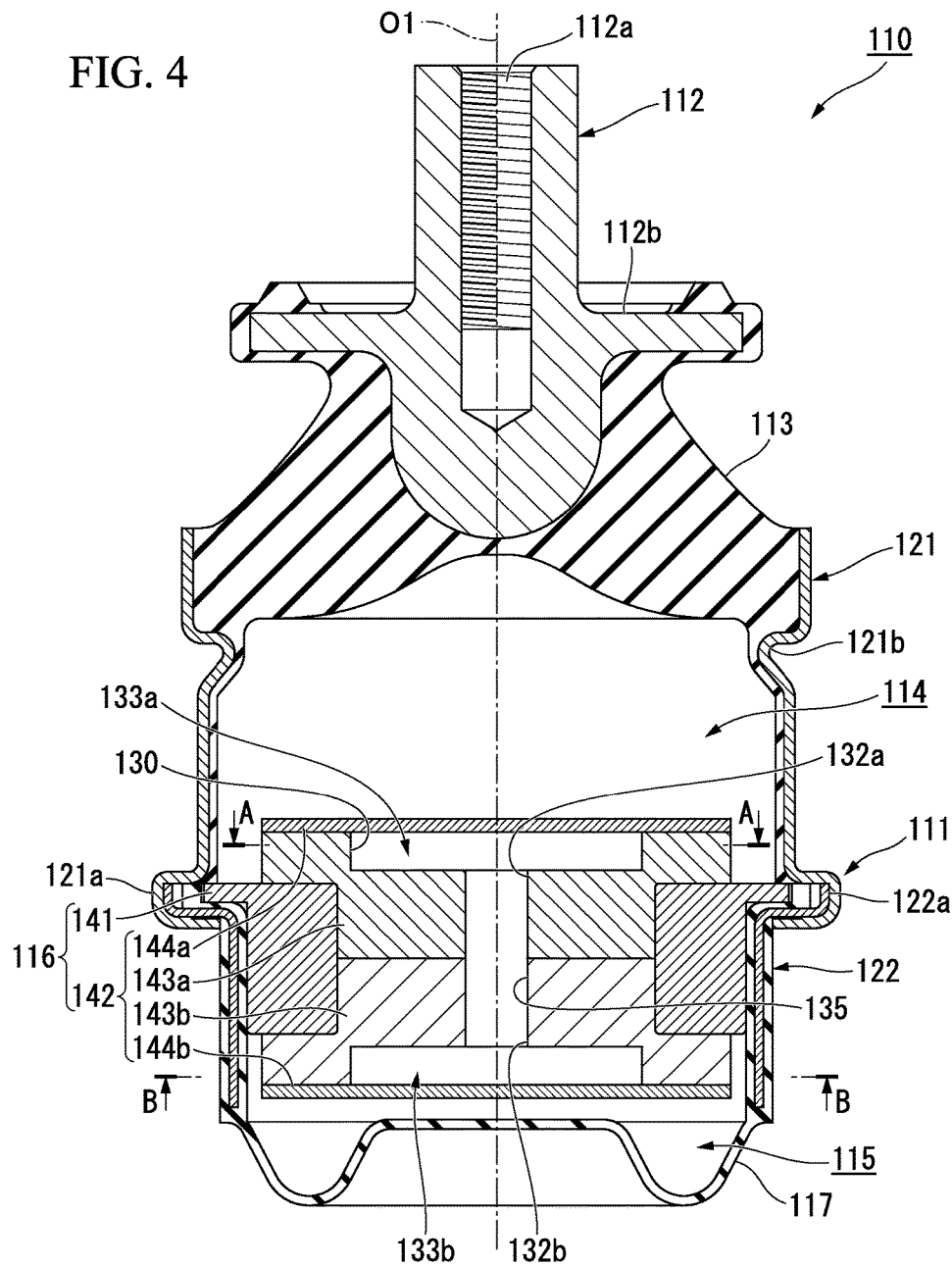
FIG. 4 is a longitudinal cross-sectional view of an anti-vibration apparatus according to a third embodiment of the present invention.

As shown in FIG. 4, an anti-vibration apparatus 110 includes a first attachment member 111 having a tubular shape and connected to any one of a vibration generating section and a vibration receiving section, a second attachment member 112 connected to the other section, an elastic body 113 configured to connect the attachment members 111 and 112 to each other, and a partition member 116 configured to partition a liquid chamber in the first attachment member 111 in which the liquid is sealed into a main liquid chamber (a first liquid chamber) 114 having the elastic body 113 at a portion of the wall surface and a subsidiary liquid chamber (a second liquid chamber) 115.

In the example shown, the second attachment member 112 is formed in a columnar shape, the elastic body 113 is formed in a tubular shape, and the first attachment member 111, the second attachment member 112 and the elastic body 113 are disposed coaxially with a common axis. Hereinafter, the common axis is referred to as an axis O1 (an axis of the first attachment member), the main liquid chamber 114 side in the axis O1 direction is referred to as one side, the subsidiary liquid chamber 115 side is referred to as the other side, a direction perpendicular to the axis O1 is referred to as a radial direction, and a direction of rotation about the axis O1 is referred to as a circumferential direction.

Further, when the anti-vibration apparatus 110 is mounted on, for example, an automobile, while the second attachment member 112 is connected to the engine serving as the vibration generating section, the first attachment member 111 is connected to the vehicle body serving as the vibration receiving section via a bracket (not shown), and the vibrations of the engine are suppressed from being transmitted to the vehicle body. The anti-vibration apparatus 110 is a liquid sealing type in which the liquid such as ethylene glycol, water, silicone oil, or the like, is sealed in the liquid chamber of the first attachment member 111.

The first attachment member 111 includes one side outer tubular body 121 disposed at one side in the axis O1 direction, and the other side outer tubular body 122 disposed at the other side.

The elastic body 113 is connected to an end section of one side of the one side outer tubular body 121 in a liquid-tight state, and an opening section of the one side of the one side outer tubular body 121 is closed by the elastic body 113. An end section 121a of the other side of the one side outer tubular body 121 has a larger diameter than the other portion. Then, the inside of the one side outer tubular body 121 becomes the main liquid chamber 114. Further, in the one side outer tubular body 121, an annular groove 121b continuously extending throughout the entire circumference is formed at a portion continued from the other side with respect to a portion to which the elastic body 113 is connected.

A diaphragm 117 is connected to the end section of the other side of the other side outer tubular body 122 in a liquid-tight state, and the opening section of the other side of the other side outer tubular body 122 is closed by the diaphragm 117. In the other side outer tubular body 122, an end section 122a of the one side has a larger diameter than the other portion and is fitted into the end section 121a of the other side of the one side outer tubular body 121. In addition, the partition member 116 is fitted into the other side outer tubular body 122, and a portion in the other side outer tubular body 122 disposed between the partition member 116 and the diaphragm 117 becomes the subsidiary liquid chamber 115. Further, the other side outer tubular body 122 is coated with a rubber membrane integrally formed with the diaphragm 117 throughout substantially the entire region.

A female screw section 112a is formed at an end surface of the one side of the second attachment member 112 coaxially with the axis O1. The second attachment member 112 protrudes from the first attachment member 111 toward the one side. A flange section 112b protruding outward in the radial direction and continuously extending throughout the entire circumference is formed at the second attachment member 112. The flange section 112b is separated from an edge of the one side of the first attachment member 111 toward the one side.

The elastic body 113 is formed of an elastically deformable material such as a rubber material or the like, and formed in a tubular shape having a diameter gradually increased from the one side toward the other side. In the elastic body 113, the end section of the one side is connected to the second attachment member 112, and the end section of the other side is connected to the first attachment member 111. Further, the inner circumferential surface of the one side outer tubular body 121 of the first attachment member 111 is covered by the rubber membrane integrally formed with the elastic body 113 throughout substantially the entire region.

Figure 5:
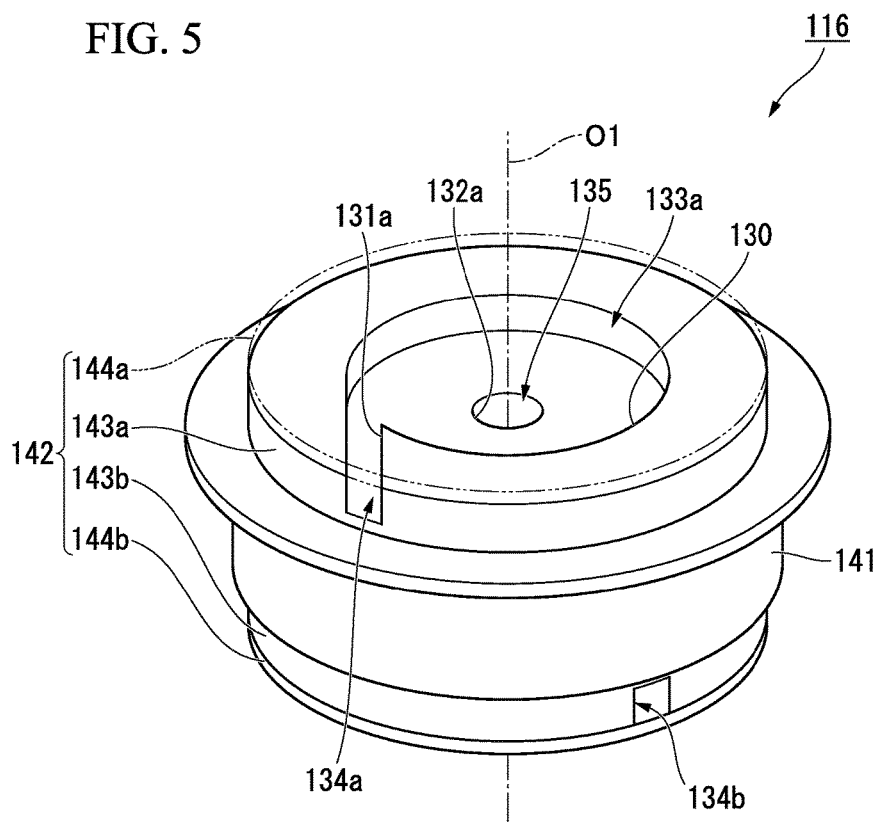
FIG. 5 is a perspective view showing a partition member that constitutes the anti-vibration apparatus shown in FIG. 4.
Figure 6:
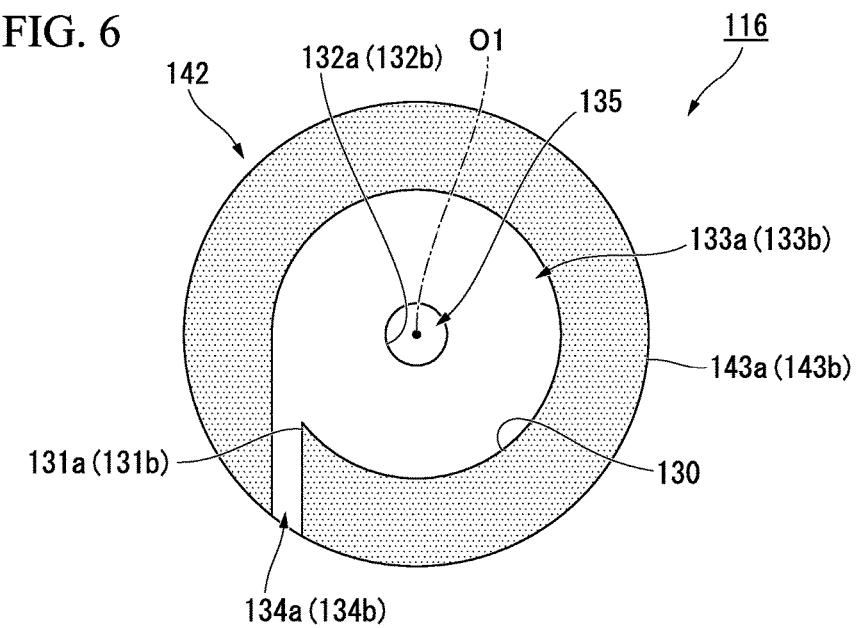
FIG. 6 is a cross-sectional view of the partition member corresponding to a cross-sectional view taken along line A-A and a cross-sectional view taken along line B-B of FIG. 4.

As shown in FIGS. 4 to 6, vortex chambers (intermediate chambers) 133a and 133b in communication with one liquid chamber of the main liquid chamber 114 and the subsidiary liquid chamber 115 through rectification paths (a first communication path, a second communication path) 134a and 134b and in communication with the other liquid chamber through communication holes (a first opening section, a second opening section) 132a and 132b are formed in the partition member 116. The vortex chambers 133a and 133b form a swirl flow of the liquid according to the flow velocity of the liquid flowing from the rectification paths 134a and 134b and discharges the liquid from the communication holes 132a and 132b.

The vortex chambers 133a and 133b are provided as the first vortex chamber 133a and the second vortex chamber 133b. The first vortex chamber 133a and the second vortex chamber 133b are disposed coaxially with the axis O1. The first vortex chamber 133a comes in communication with the main liquid chamber 114 through the first rectification path (the first communication path) 134a serving as a rectification path, and comes in communication with the subsidiary liquid chamber 115 through the first communication hole (the second opening section) 132a serving as a communication hole. The second vortex chamber 133b comes in communication with the subsidiary liquid chamber 115 through the second rectification path (the second communication path) 134b serving as a rectification path, and comes in communication with the main liquid chamber 114 through the second communication hole (the first opening section) 132b serving as a communication hole.

In the embodiment, the partition member 116 includes a mounting section 141 mounted on the first attachment member 111, and a flow path forming section 142 in which the vortex chambers 133a and 133b are formed. The mounting section 141 is formed in an annular shape coaxially with the axis O1 to be fitted into the other side outer tubular body 122. The flow path forming section 142 is fitted into the mounting section 141. The flow path forming section 142 includes a pair of main body sections 143a and 143b disposed in the axis O1 direction, and a pair of lid sections 144a and 144b attached to the pair of main body sections 143a and 143b, respectively.

The main body sections 143a and 143b are formed in a bottomed cylindrical shape, and the pair of main body sections 143a and 143b are inversely disposed in the axis O1 direction such that bottom sections thereof abut each other in the axis O1 direction. The bottom sections of the main body sections 143a and 143b are fitted into the mounting section 141. The lid sections 144a and 144b close the inside of the main body sections 143a and 143b from the outside in the axis O1 direction.

Then, the first vortex chamber 133a is defined between the first main body section 143a disposed at the one side in the axis O1 direction of the pair of main body sections 143a and 143b and the first lid section 144a serving as a lid section attached to the first main body section 143a. The first vortex chamber 133a is constituted by the inside of the first main body section 143a closed by the first lid section 144a. The first vortex chamber 133a is disposed coaxially with the axis O1, and the inner circumferential surface of the first vortex chamber 133a is formed in a circular shape.

In addition, the first rectification path 134a is formed in the first main body section 143a. The first rectification path 134a is opened in a circumferential direction (a circumferential direction of the vortex chamber) from the outer surface exposed to the main liquid chamber 114 toward the inside of the first vortex chamber 133a in the first main body section 143a. The first rectification path 134a linearly extends in a direction along an orthogonal surface perpendicular to the axis O1. The first rectification path 134a extends from the inner circumferential surface of the first vortex chamber 133a in a tangential direction of the inner circumferential surface. Further, the liquid flowing into the first vortex chamber 133a through the first opening (the first opening section) 131a opened from the first rectification path 134a toward the inner circumferential surface of the first vortex chamber 133a turns as the liquid flows along the inner circumferential surface of the first vortex chamber 133a.

Further, the second vortex chamber 133b is defined between the second main body section 143b disposed at the other side in the axis O1 direction of the pair of main body sections 143a and 143b and the second lid section 144b serving as the lid section attached to the second main body section 143b. The second vortex chamber 133b is constituted by the inside of the second main body section 143b closed by the second lid section 144b. The second vortex chamber 133b is disposed coaxially with the axis O1, and the inner circumferential surface of the second vortex chamber 133b is formed in a circular shape.

Then, the second rectification path 134b is formed at the second main body section 143b. The second rectification path 134b is opened in the circumferential direction (the circumferential direction of the vortex chamber) from the outer surface exposed to the subsidiary liquid chamber 115 in the second main body section 143b toward the inside of the second vortex chamber 133b. The second rectification path 134b extends linearly in a direction along the orthogonal surface. The second rectification path 134b extends from the inner circumferential surface of the second vortex chamber 133b in the tangential direction of the inner circumferential surface. Further, the liquid flowing into the second vortex chamber 133b through the second opening (the second opening section) 131b opened from the second rectification path 134b toward the inner circumferential surface of the second vortex chamber 133b turns as the liquid flows along the inner circumferential surface of the second vortex chamber 133b.

In addition, a communication path (a first communication path, a second communication path) 135 configured to bring the first vortex chamber 133a and the second vortex chamber 133b in communication with each other is formed at the flow path forming section 142. The communication path 135 is disposed between the first vortex chamber 133a and the second vortex chamber 133b and extends in the axis O1 direction. The communication path 135 is disposed coaxially with the axis O1, and the inner circumferential surface of the communication path 135 is formed in a circular shape. The communication path 135 is opened from an end surface (an end surface in the axial direction, a bottom surface) directed in the axis O1 direction of the wall surfaces that define the first vortex chamber 133a and the second vortex chamber 133b toward the inside of the vortex chambers 133a and 133b. Then, in the communication path 135, the opening section opened at the first vortex chamber 133a becomes the first communication hole 132a, and the opening section opened at the second vortex chamber 133b becomes the second communication hole 132b.

The first communication hole 132a is opened in the axis O1 direction (an axial direction of the vortex chamber) from the end surface of the first vortex chamber 133a toward the inside of the first vortex chamber 133a. The first communication hole 132a is disposed on the axis O1 (an axis of the vortex chamber), in the example shown, coaxially with the axis O1. That is, an opening axis of the first communication hole 132a and an opening axis of the first opening 131a are offset to each other, and the first communication hole 132a and the first opening 131a are opened toward the wall surfaces of the first vortex chamber 133a.

The second communication hole 132b is opened in the axis O1 direction (the axis direction of the vortex chamber) from the end surface of the second vortex chamber 133b toward the inside of the second vortex chamber 133b. The second communication hole 132b is disposed on the axis O1 (the axis of the vortex chamber), in the example shown, coaxially with the axis O1. That is, an opening axis of the second communication hole 132b and an opening axis of the second opening 131b are offset to each other, and the second communication hole 132b and the second opening 131b are opened toward the wall surfaces of the second vortex chamber 133b.

Here, the first rectification path 134a, the first opening 131a, the first vortex chamber 133a, the first communication hole 132a, the communication path 135, the second communication hole 132b, the second vortex chamber 133b, the second opening 131b and the second rectification path 134b constitute a connection flow path 130 configured to bring the main liquid chamber 114 and the subsidiary liquid chamber 115 in communication with each other. The connection flow path 130 is formed in the partition member 116, and the main liquid chamber 114 and the subsidiary liquid chamber 115 are in communication with each other through only the connection flow path 130. Then, the first communication hole 132a comes in communication with the subsidiary liquid chamber 115 through the second communication hole 132b, the second vortex chamber 133b, the second opening 131b and the second rectification path 134b, and the second communication hole 132b comes in communication with the main liquid chamber 114 through the first communication hole 132a, the first vortex chamber 133a, the first opening 131a and the first rectification path 134a.

Figure 7:
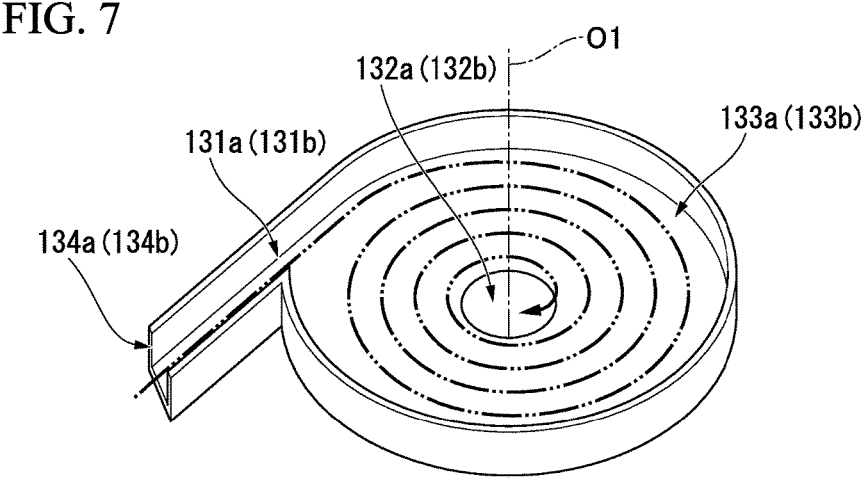
FIG. 7 is a schematic view of a vortex chamber installed at the partition member shown in FIG. 5, describing a flow of a liquid when a flow velocity of the liquid flowing from a rectification path is high.
Figure 8:
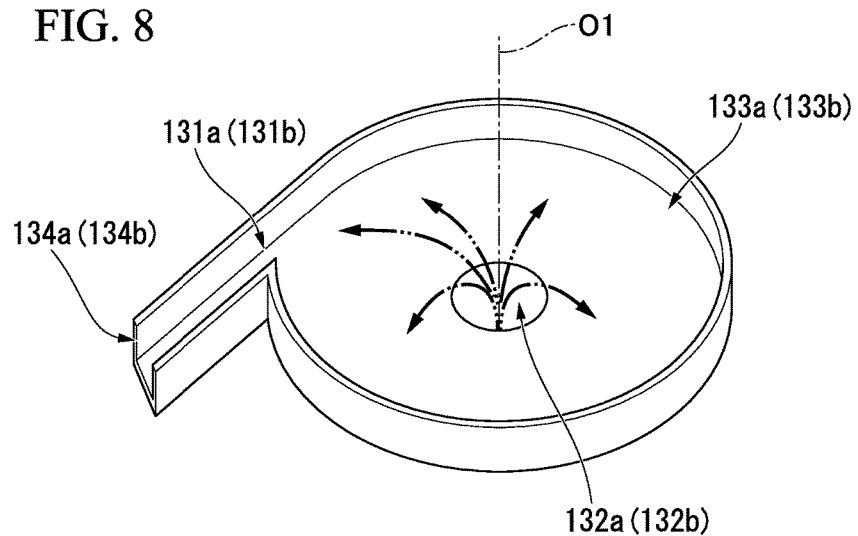
FIG. 8 is a schematic view of the vortex chamber installed at the partition member shown in FIG. 5, describing a flow of a liquid flowing from a communication hole.
Figure 9:
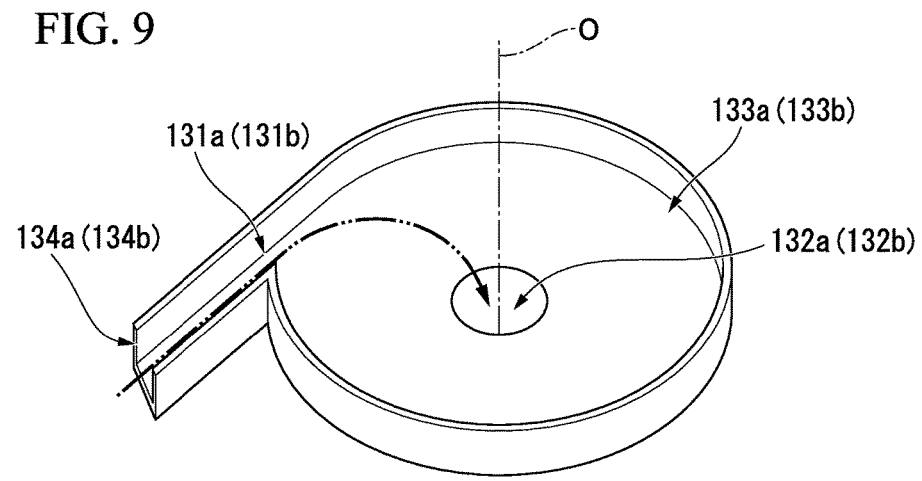
FIG. 9 is a schematic view of the vortex chamber installed at the partition member shown in FIG. 5, describing a flow of the liquid when a flow velocity of the liquid flowing from the rectification path is low.

An action of the anti-vibration apparatus 110 having the above-mentioned configuration will be described with reference to FIGS. 4 to 9. Further, FIGS. 7 to 9 show schematic perspective views of the vortex chambers 133a and 133b.

When the vibrations in the axis O1 direction are input from the vibration generating section into the anti-vibration apparatus 110 shown in FIG. 4, both of the attachment members 111 and 112 are relatively displaced to each other while elastically deforming the elastic body 113 to vary the liquid pressure of the main liquid chamber 114. Then, the liquid flows back and forth between the main liquid chamber 114 and the subsidiary liquid chamber 115 through the connection flow path 130.

Here, when the liquid in the main liquid chamber 114 flows toward the subsidiary liquid chamber 115 through the connection flow path 130, first, the liquid flows into the first vortex chamber 133a through the first rectification path 134a and the first opening 131a. Here, as the liquid flows through the first rectification path 134a, the liquid is rectified in the tangential direction to increase the flow velocity.

Here, conventionally, vibrations such as idle vibrations (for example, a frequency is 18 Hz to 30 Hz and an amplitude is ±0.5 mm or less), shake vibrations (for example, a frequency is 14 Hz or less and an amplitude is larger than ±0.5 mm) having a frequency smaller than the idle vibrations and an amplitude larger than the idle vibrations, or the like, are input into the anti-vibration apparatus 110. In these vibrations, the idle vibrations have a relatively small amplitude and a relatively high frequency, and the shake vibrations have a low frequency and a large amplitude. Accordingly, when the conventional vibrations are input, the flow velocity of the liquid flowing into the first vortex chamber 133a through the first rectification path 134a can be increased to a certain level or more. Accordingly, as shown by a two-dot chain line of FIG. 7, the swirling flow of the liquid can be formed in the first vortex chamber 133a. That is, when the liquid flows into the first vortex chamber 133a from the first opening 131a, if the flow velocity of the liquid is increased, the liquid linearly advances through the first vortex chamber 133a to reach the inner circumferential surface (the wall surface) of the first vortex chamber 133a, and a flow of the liquid is varied along the inner circumferential surface.

As a result, for example, due to a viscous resistance of the liquid, energy loss caused by formation of the swirl flow, energy loss caused by friction between the liquid and the wall surfaces of the first vortex chamber 133a, and so on, the pressure loss of the liquid is increased. Accordingly, the vibrations are absorbed and attenuated. Further, here, when a flow rate of the liquid flowing into the first vortex chamber 133a is remarkably increased according to an increase in flow velocity of the liquid, the first vortex chamber 133a is filled with the swirl flow formed by the liquid flowing into the first vortex chamber 133a. In this state, when the liquid further flows into the first vortex chamber 133a, the pressure loss of the liquid can be largely secured.

After that, the liquid that turns in the first vortex chamber 133a flows out of the first communication hole 132a, and flows into the subsidiary liquid chamber 115 through the communication path 135, the second communication hole 132b, the second vortex chamber 133b, the second opening 131b and the second rectification path 134b. Here, as shown by a two-dot chain line in FIG. 8, the liquid flowing into the second vortex chamber 133b from the second communication hole 132b simply passes through the second vortex chamber 133b to flow into the subsidiary liquid chamber 115 without turning.

In addition, when the liquid in the subsidiary liquid chamber 115 flows toward the main liquid chamber 114 through the connection flow path 130, first, the liquid flows into the second vortex chamber 133b through the second rectification path 134b and the second opening 131b. Even at this time, when the flow velocity of the liquid has a certain level or more, as shown by a two-dot chain line in FIG. 7, the swirl flow of the liquid can be formed in the second vortex chamber 133b, and the pressure loss of the liquid is increased and the vibrations are absorbed and attenuated. That is, when the liquid flows into the second vortex chamber 133b from the second opening 131b, if the flow velocity of the liquid is increased, the liquid linearly advances through the second vortex chamber 133b to reach the inner circumferential surface (the wall surface) of the second vortex chamber 133b, and the flow of the liquid is varied along the inner circumferential surface. Further, in the example shown, the swirl flow in the second vortex chamber 133b turns toward an opposite side in the circumferential direction of the swirl flow in the first vortex chamber 133a.

Then, the liquid turning in the second vortex chamber 133b flows out of the second communication hole 132b, and then, flow into the main liquid chamber 114 through the communication path 135, the first communication hole 132a, the first vortex chamber 133a, the first opening 131a and the first rectification path 134a. Here, as shown by a two-dot chain line in FIG. 8, the liquid flowing into the first vortex chamber 133a from the first communication hole 132a simply passes through the first vortex chamber 133a to flow into the main liquid chamber 114 without turning.

In the anti-vibration apparatus 110, for example, the micro vibrations or the like having the frequency higher than assumed and extremely small amplitude may be unintentionally input. When the micro vibrations are input, since the flow velocity of the liquid flowing into the vortex chambers 133a and 133b through the rectification paths 134a and 134b is low, the liquid is suppressed from turning in the vortex chambers 133a and 133b as shown by a two-dot chain line in FIG. 9. Then, when the swirl flow of the liquid does not occur in the vortex chambers 133a and 133b, since the liquid simply passes and smoothly flows through the vortex chambers 133a and 133b, an increase in the dynamic spring constant is suppressed. That is, when the flow velocity of the liquid is low, the liquid flowing into the vortex chambers 133a and 133b is suppressed from linearly advancing from the first opening 131a and the second opening 131b to pass through the short path in the intermediate chamber.

As described above, according to the anti-vibration apparatus 110 of the embodiment, as the swirl flow of the liquid is formed in the vortex chambers 133a and 133b, the pressure loss of the liquid can be increased and the vibrations can be absorbed and attenuated. Accordingly, for example, when the conventional vibrations such as idle vibrations, shake vibrations, or the like, are input, regardless of a frequency of the vibrations, the vibrations can be absorbed and attenuated according to the flow velocity of the liquid. Accordingly, simplification of the structure and facilitation of the manufacturing can be performed while absorbing and attenuating a plurality of types of vibrations having different frequencies.

In addition, in a state in which the flow velocity is low and the liquid is suppressed from turning in the vortex chambers 133a and 133b, an increase in dynamic spring constant is suppressed. Accordingly, for example, when the flow velocity of the liquid is lower than when the conventional vibrations are input, for example, when the unintentional vibrations such as the micro vibrations or the like having a higher frequency and a significantly smaller amplitude than the conventional vibrations are input, and so on, an increase in the dynamic spring constant can be suppressed. As a result, product characteristics of the anti-vibration apparatus 110 can be easily secured.

In addition, since the communication holes 132a and 132b are opened in the vortex chambers 133a and 133b from the end surfaces of the vortex chambers 133a and 133b, the swirl flow of the liquid can be stably generated, and the pressure loss of the liquid can be effectively increased.

Further, since the communication holes 132a and 132b are disposed coaxially with the axis O1, a length in the turning direction of the swirl flow of the liquid formed in the vortex chambers 133a and 133b is largely secured such that the liquid can be easily remained in the vortex chambers 133a and 133b. As a result, the pressure loss of the liquid can be more effectively increased.

In addition, the first vortex chamber 133a and the second vortex chamber 133b are assembled and provided. Accordingly, as the liquid flowing into the subsidiary liquid chamber 115 from the main liquid chamber 114 passes through the first rectification path 134a, the first vortex chamber 133a and the first communication hole 132a, the pressure loss of the liquid can be increased. Further, even as the liquid flowing into the main liquid chamber 114 from the subsidiary liquid chamber 115 passes through the second rectification path 134b, the second vortex chamber 133b and the second communication hole 132b, the pressure loss of the liquid can be increased. Accordingly, the vibrations can be effectively absorbed and attenuated.

Further, in the embodiment, while the rectification paths 134a and 134b are formed in the vortex chambers 133a and 133b one to one, the present invention is not limited thereto. For example, a plurality of rectification paths may be formed in each of the vortex chambers.

In addition, in the embodiment, while the first vortex chamber 133a and the second vortex chamber 133b come in communication with each other through the communication path 135, the present invention is not limited thereto. For example, the first vortex chamber and the second vortex chamber may be adjacent to each other in the axial direction via a thin-plate-shaped wall section, and the vortex chambers may be in communication with each other through a hole section formed in the wall section in the axial direction. In this case, each of the first communication hole and the second communication hole can be constituted by the common hole section.

In addition, in the embodiment, while the first communication hole 132a comes in communication with the subsidiary liquid chamber 115 through the second communication hole 132b, the second vortex chamber 133b, the second opening 131b and the second rectification path 134b, the present invention is not limited thereto. For example, the first communication hole may be directly opened in a subsidiary liquid chamber. In this case, for example, the first rectification path may come in communication with a main liquid chamber through the second rectification path, the second opening, the second vortex chamber and the second communication hole, rather than the first communication hole.

In addition, in the embodiment, while the second communication hole 132b comes in communication with the main liquid chamber 114 through the first communication hole 132a, the first vortex chamber 133a, the first opening 131a and the first rectification path 134a, the present invention is not limited thereto. For example, the second communication hole may be directly opened in the main liquid chamber. In this case, for example, the second rectification hole may come in communication with the subsidiary liquid chamber through the first rectification path, the first opening, the first vortex chamber and the first communication hole, rather than the second communication hole.

In addition, in the embodiment, while the vortex chambers 133a and 133b are provided as the first vortex chamber 133a and the second vortex chamber 133b, the present invention is not limited thereto. For example, only the first vortex chamber may be provided or only the second vortex chamber may be provided.

In addition, the vortex chambers 133a and 133b are not limited to that shown in the embodiment but may form the swirl flow of the liquid according to the flow velocity of the liquid flowing from the rectification path, and may be appropriately modified to the other configuration in which the liquid is discharged from the communication hole.

In addition, in the embodiment, a restriction passage independent from the connection flow path 130 may be formed at the partition member 116.

In addition, in the embodiment, when the unintentional vibrations such as the micro vibrations or the like are input into the anti-vibration apparatus 110, a resonant frequency of the rectification paths 134a and 134b or a resonant frequency of the communication path 135 may be set such that a resonance occurs in the rectification paths 134a and 134b or the communication path 135.

In addition, in the embodiment, the inside of the rectification paths 134a and 134b or the inside of the communication path 135 may be closed by a film body elastically deformed by the liquid pressure of the liquid, for example, an elastic thin film or the like. Even in this case, as the liquid pressure of the liquid disposed at both sides with the film body sandwiched therebetween is transmitted via the film body, the liquid flows through the rectification paths 134a and 134b or the communication path 135.

(Fourth Embodiment)

Hereinafter, a fourth embodiment of the anti-vibration apparatus according to the present invention will be described with reference to FIGS. 10 to 12.

Figure 10:
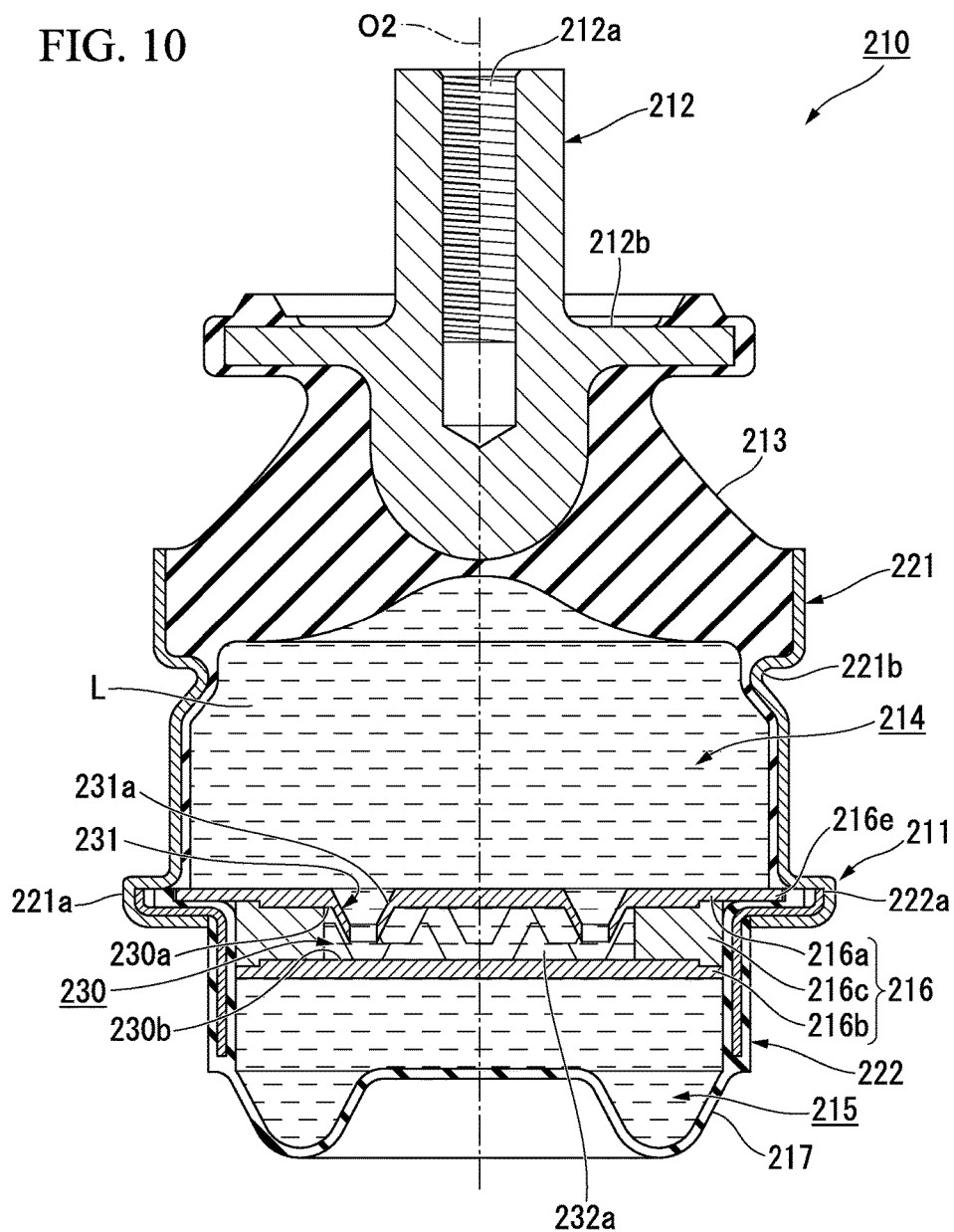
FIG. 10 is a longitudinal cross-sectional view of an anti-vibration apparatus according to a fourth embodiment of the present invention.

As shown in FIG. 10, an anti-vibration apparatus 210 includes a first attachment member 211 having a tubular shape and connected to any one of the vibration generating section and the vibration receiving section, a second attachment member 212 connected to the other section, an elastic body 213 configured to connect the attachment members 211 and 212 to each other, and a partition member 216 configured to partition a liquid chamber in the first attachment member 211 in which the liquid L is sealed into a main liquid chamber (a first liquid chamber) 214 having the elastic body 213 at a portion of the wall surface and a subsidiary liquid chamber (a second liquid chamber) 215.

In the example shown, the second attachment member 212 is formed in a columnar shape, the elastic body 213 is formed in a tubular shape, and the first attachment member 211, the second attachment member 212 and the elastic body 213 are disposed coaxially with a common axis. Hereinafter, the common axis is referred to an axis (an axis of the first attachment member) O2, the main liquid chamber 214 side in the axis O2 direction (an axial direction of the communication hole, an opposite direction) is referred to as one side, the subsidiary liquid chamber 215 side is referred to as the other side, a direction perpendicular to the axis O2 is referred to as a radial direction, and a direction of rotation about the axis O2 is referred to as a circumferential direction.

Further, when the anti-vibration apparatus 210 is mounted on, for example, an automobile, the second attachment member 212 is connected to the engine serving as the vibration generating section, the first attachment member 211 is connected to the vehicle body serving as the vibration receiving section via a bracket (not shown), and thus, vibrations of the engine are suppressed from being transmitted to the vehicle body. The anti-vibration apparatus 210 is a liquid sealing type in which the liquid L such as ethylene glycol, water, silicone oil, or the like, is sealed in the liquid chamber of the first attachment member 211.

The first attachment member 211 includes one side outer tubular body 221 disposed at one side in the axis O2 direction, and the other side outer tubular body 222 disposed at the other side.

The elastic body 213 is connected to an end section of the one side of the one side outer tubular body 221 in a liquid-tight state, and an opening section of the one side of the one side outer tubular body 221 is closed by the elastic body 213. In the one side outer tubular body 221, an end section 221a of the other side has a larger diameter than the other portion. Then, the inside of the one side outer tubular body 221 becomes the main liquid chamber 214. A liquid pressure of the main liquid chamber 214 is varied as an internal volume of the main liquid chamber 214 is varied by deforming the elastic body 213 upon input of the vibrations. Further, in the one side outer tubular body 221, an annular groove 221b continuously extending throughout the entire circumference is formed at a portion continued from the other side with respect to the portion to which the elastic body 213 is connected.

A diaphragm 217 is connected to an end section of the other side of the other side outer tubular body 222 in a liquid-tight state, and the opening section of the other side of the other side outer tubular body 222 is closed by the diaphragm 217. In the other side outer tubular body 222, an end section 222a of the one side has a larger diameter than the other portion, and is fitted into the end section 221a of the other side of the one side outer tubular body 221. In addition, the partition member 216 is fitted into the other side outer tubular body 222, and a portion in the other side outer tubular body 222 disposed between the partition member 216 and the diaphragm 217 becomes the subsidiary liquid chamber 215. The subsidiary liquid chamber 215 has the diaphragm 217 at a portion of the wall surface, and expands or contracts as the diaphragm 217 is deformed. Further, the other side outer tubular body 222 is covered by a rubber membrane integrally formed with the diaphragm 217 through the entire region.

A female screw section 212a is formed at an end surface of the one side of the second attachment member 212 coaxially with the axis O2. The second attachment member 212 protrudes from the first attachment member 211 toward the one side. A flange section 212b protruding outward in the radial direction and continuously extending throughout the entire circumference is formed at the second attachment member 212. The flange section 212b is separated from an edge of the one side of the first attachment member 211 toward the one side.

The elastic body 213 is formed of an elastically deformable material such as a rubber material or the like, and formed in a tubular shape having a diameter gradually increased from the one side toward the other side. In the elastic body 213, the end section of the one side is connected to the second attachment member 212, and the end section of the other side is connected to the first attachment member 211. Further, the inner circumferential surface of the one side outer tubular body 221 of the first attachment member 211 is covered by a rubber membrane integrally formed with the elastic body 213 throughout substantially the entire region.

The partition member 216 includes a pair of end surface sections 216a and 216b, and a circumferential wall section 216c. The pair of end surface sections 216a and 216b formed in a plate shape having front and rear surfaces directed in the axis O2 direction, and disposed coaxially with the axis O2. In the pair of end surface sections 216a and 216b, the first end surface section 216a disposed at the one side has a larger diameter than the second end surface section 216b disposed at the other side.

The first end surface section 216a and the second end surface section 216b are disposed spaced apart in the axis O2 direction, and sandwiches the circumferential wall section 216c therebetween in the axis O2 direction. The circumferential wall section 216c is formed in an annular shape opened in the axis O2 direction and disposed coaxially with the axis O2. As shown in FIG. 11, a protrusion section 216*d* protruding inward the radial direction is formed at the circumferential wall section 216*c*. The plurality of protrusion sections 216*d* are disposed spaced apart in the circumferential direction and sandwiched between the pair of end surface sections 216*a* and 216*b* in the axis O2 direction.

As shown in FIG. 10, an outer diameter of the circumferential wall section 216*c* is equal to an outer diameter of the second end surface section 216*b*, and the circumferential wall section 216*c* and the second end surface section 216*b* are fitted into the first attachment member 211. In the first end surface section 216*a*, a flange section 216*e* protruding farther outward in the radial direction than the circumferential wall section 216*c* is disposed in the end section 222*a* of the one side of the other side outer tubular body 222.

A communication chamber 230 configured to bring the main liquid chamber 214 and the subsidiary liquid chamber 215 in communication with each other is formed at the partition member 216. The communication chamber 230 is provided between the first end surface section 216*a*, the second end surface section 216*b* and the circumferential wall section 216*c*, and the inside of the circumferential wall section 216*c* is closed by the first end surface section 216*a* and the second end surface section 216*b* from both sides in the axis O2 direction. The communication chamber 230 is formed in a flat columnar shape disposed coaxially with the axis O2.

A first wall surface 230*a* and a second wall surface 230*b* opposite to each other are formed at the wall surfaces that form the communication chamber 230 of the partition member 216 with the communication chamber 230 sandwiched therebetween. The first wall surface 230*a* and the second wall surface 230*b* face each other in the axis O2 direction. The first wall surface 230*a* is constituted by the wall surface of the first end surface section 216*a* directed toward the other side, and the second wall surface 230*b* is constituted by the wall surface of the second end surface section 216*b* directed toward the one side.

Communication holes (a first communication path, a second communication path) 231 and 232 opened toward the communication chamber 230 are formed in the first wall surface 230*a* and the second wall surface 230*b*, respectively. The communication holes 231 and 232 are provided as the first communication hole (the first communication path) 231 formed in the first wall surface 230*a*, and the second communication hole (the second communication path) 232 formed in the second wall surface 230*b*. The first communication hole 231 brings the communication chamber 230 and the main liquid chamber 214 in communication with each other, and the second communication hole 232 brings the communication chamber 230 and the subsidiary liquid chamber 215 in communication with each other. The plurality of first communication holes 231 and the plurality of second communication holes 232 are formed, and in the example shown, the same number of first communication holes 231 and second communication holes 232 are formed.

Here, the communication holes 231 and 232 are formed by the inside of protrusion tubes 231*a* and 232*a* protruding from the first wall surface 230*a* or the second wall surface 230*b* toward the inside of the communication chamber 230. In the embodiment, the first communication hole 231 is formed by the inside of the first protrusion tube 231*a* protruding from the first wall surface 230*a* toward the inside of the communication chamber 230, and the second communication hole 232 is formed by the inside of the second protrusion tube 232*a* protruding from the second wall surface 230*b* toward the inside of the communication chamber 230.

Both the first protrusion tube 231*a* and the second protrusion tube 232*a* also extend in the axis O2 direction, and both the first communication hole 231 and the second communication hole 232 are also opened at both sides in the axis O2 direction. An axis of the first protrusion tube 231*a* and an axis of the second protrusion tube 232*a* are disposed to be misaligned in an orthogonal direction along the orthogonal surface perpendicular to the axis O2, and the first communication hole 231 and the second communication hole 232 are disposed to be misaligned in the orthogonal direction. That is, an opening axis of a small diameter section 231*g* (to be described below) of the first communication hole 231 and an opening axis of a small diameter section 232*g* (to be described below) of the second communication hole 232 are offset to each other. Further, the small diameter section 231*g* of the first communication hole 231 is opened toward the second wall surface 230*b*, and the small diameter section 232*g* of the second communication hole 232 is opened toward the first wall surface 230*a*.

Figure 11:
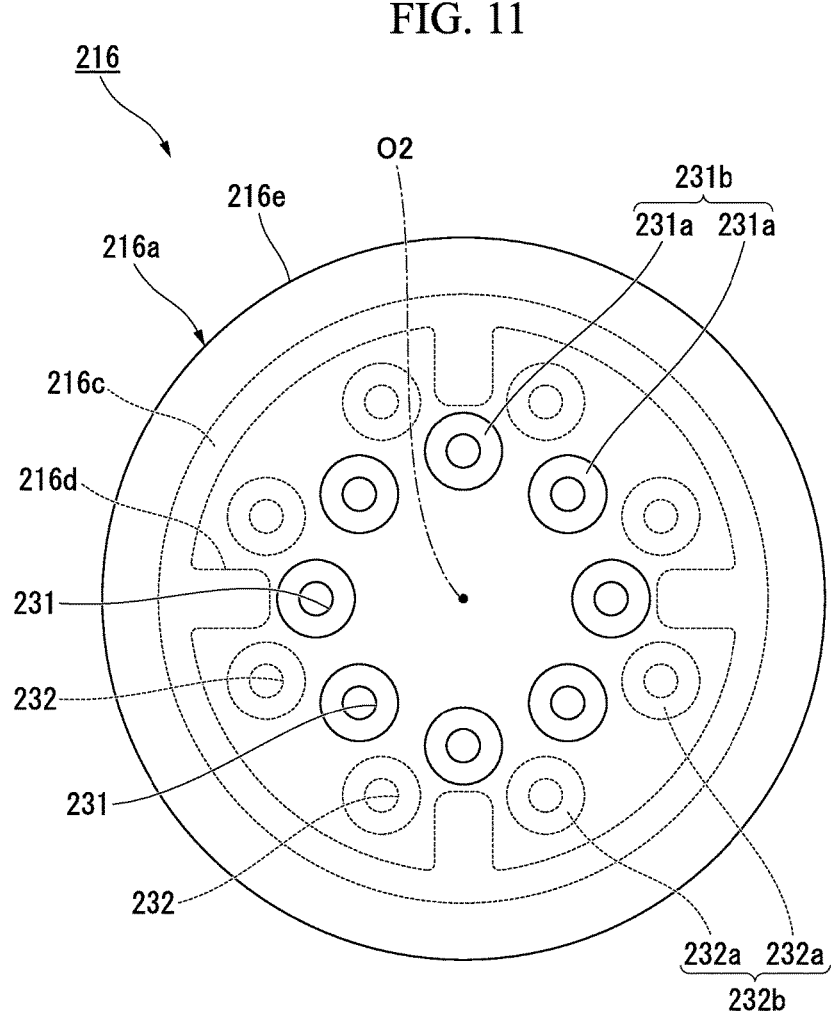
FIG. 11 is a plan view of a partition member that constitutes the anti-vibration apparatus shown in FIG. 10.

As shown in FIGS. 10 and 11, the first protrusion tube 231*a* protrudes from the first wall surface 230*a* toward the other side, and is integrally formed of the same material as the first end surface section 216*a*. A plurality of first protrusion tubes 231*a* are disposed at equal intervals in the circumferential direction, and the plurality of first protrusion tubes 231*a* constitute a tube array 231*b* disposed coaxially with the axis O2 to form an annular shape.

The second protrusion tube 232*a* has the same shape and the same size as the first protrusion tube 231*a*. The second protrusion tube 232*a* protrudes from the second wall surface 230*b* toward the other side, and is integrally formed of the same material as the second end surface section 216*b*. A plurality of second protrusion tubes 232*a* are disposed at equal intervals in the circumferential direction, and the plurality of second protrusion tubes 232*a* constitute a tube array 232*b* disposed coaxially with the axis O2 to form an annular shape.

A diameter of the tube array 231*b* of the first protrusion tube 231*a* is different from a diameter of the tube array 232*b* of the second protrusion tube 232*a*, and in the embodiment, the diameter of the tube array 231*b* of the first protrusion tube 231*a* is smaller than the diameter of the tube array 232*b* of the second protrusion tube 232*a*. The first protrusion tubes 231*a* and the second protrusion tubes 232*a* are alternately disposed in the circumferential direction.

Figure 12:
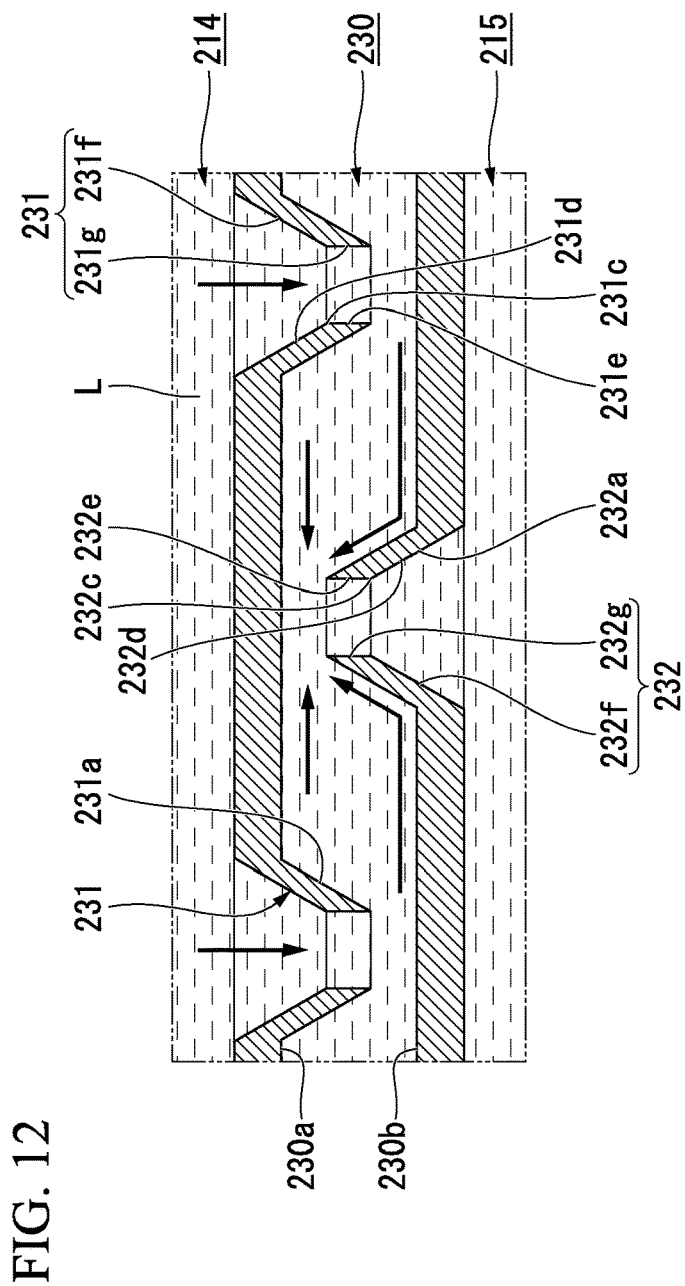
FIG. 12 is a longitudinal cross-sectional view of a periphery of the partition member that constitutes the anti-vibration apparatus shown in FIG. 10.

As shown in FIG. 12, the outer circumferential surface of the first protrusion tube 231*a* has a diameter gradually reduced from a base end section toward a protrusion end section of the first protrusion tube 231*a*. In the embodiment, the inner circumferential surface of the first protrusion tube 231*a* also has a diameter gradually reduced from the base end section toward the protrusion end section, and the entire first protrusion tube 231*a* has a diameter gradually reduced from the base end section toward the protrusion end section.

The outer circumferential surface of the first protrusion tube 231*a* smoothly continuously extends in the axis O2 direction without going through a step section, and when seen in a longitudinal cross-sectional view taken along an axis of the first protrusion tube 231*a*, linearly extends in a direction perpendicular to the axis O2 direction. The inner circumferential surface of the first protrusion tube 231*a* is divided into two sections in the axis O2 direction via an annular step section 231*c* extending in the circumferential direction of the first protrusion tube 231*a*.

In the inner circumferential surface of the first protrusion tube 231a, an inclined surface section 231d disposed closer to the one side than the step section 231c has a diameter gradually reduced from the one side toward the other side, and a straight flat surface section 231e disposed closer to the other side than the step section 231c has the same diameter throughout its entire length in the axis O2 direction. When seen in the longitudinal cross-sectional view, the inclined surface section 231d linearly extends in a direction inclined in the axis O2 direction, and the straight flat surface section 231e linearly extends in the axis O2 direction. The inclined surface section 231d is longer than the straight flat surface section 231e in the axis O2 direction, and the straight flat surface section 231e connects an edge of the other side of the inclined surface section 231d to an edge of the other side of the outer circumferential surface of the first protrusion tube 231a.

The first communication hole 231 causes a large diameter section 231f of one side defined by the inclined surface section 231d and the small diameter section (a first opening section) 231g of the other side defined by the straight flat surface section 231e to be connected in the axis O2 direction. The large diameter section 231f has a diameter gradually reduced from the one side toward the other side, and the small diameter section 231g has the same diameter throughout the entire length in the axis O2 direction.

The outer circumferential surface of the second protrusion tube 232a has a diameter gradually reduced from the base end section toward the protrusion end section of the second protrusion tube 232a. In the embodiment, the inner circumferential surface of the second protrusion tube 232a also has a diameter gradually reduced from the base end section toward the protrusion end section, and the entire second protrusion tube 232a has a diameter gradually reduced from the base end section toward the protrusion end section.

The outer circumferential surface of the second protrusion tube 232a smoothly continuously extends in the axis O2 direction without going through a step section, and when seen in a longitudinal cross-sectional view taken along an axis of the second protrusion tube 232a, extends in a linear shape in a direction inclined in the axis O2 direction. The inner circumferential surface of the second protrusion tube 232a is divided into two sections in the axis O2 direction via an annular step section 232c extending in the circumferential direction of the second protrusion tube 232a.

In the inner circumferential surface of the second protrusion tube 232a, an inclined surface section 232d disposed closer to the other side than the step section 232c has a diameter gradually reduced from the other side toward the one side, and a straight flat surface section 232e disposed closer to the one side than the step section 232c has the same diameter throughout its entire length in the axis O2 direction. When seen in the longitudinal cross-sectional view, the inclined surface section 232d linearly extends in a direction inclined in the axis O2 direction, and the straight flat surface section 232e linearly extends in the axis O2 direction. The inclined surface section 232d is longer than the straight flat surface section 232e in the axis O2 direction, and the straight flat surface section 232e connects an edge of the one side of the inclined surface section 232d to an edge of the one side of the outer circumferential surface of the second protrusion tube 232a.

The second communication hole 232 causes a large diameter section 232f of the other side defined by the inclined surface section 232d and the small diameter section (a second opening section) 232g of the one side defined by the straight flat surface section 232e to be connected in the axis O2 direction. The large diameter section 232f has a diameter reduced from the other side toward the one side, and the small diameter section 232g has the same diameter throughout its entire length in the axis O2 direction.

Further, the first protrusion tube 231a and the second protrusion tube 232a overlap in the axis O2 direction.

Next, an action of the anti-vibration apparatus 210 will be described.

When the vibrations in the axis O2 direction are input into the anti-vibration apparatus 210 shown in FIG. 10 from the vibration generating section, both of the attachment members 211 and 212 are relatively displaced to each other to vary the liquid pressure of the main liquid chamber 214 while elastically deforming the elastic body 213. Then, the liquid L flows back and forth between the main liquid chamber 214 and the subsidiary liquid chamber 215 through the communication chamber 230.

Here, the vibrations such as idle vibrations (for example, a frequency is 18 Hz to 30 Hz and an amplitude is ±0.5 mm or less), shake vibrations (for example, a frequency is 14 Hz or less and an amplitude is larger than ±0.5 mm) having a frequency smaller than and an amplitude larger than the idle vibrations, or the like, are conventionally input into the anti-vibration apparatus 210. In these vibrations, the idle vibrations have a relatively small amplitude and high frequency and the shake vibration have a low frequency and large amplitude. Accordingly, when the conventional vibrations are input, every flow velocity of the liquid L flowing into the communication chamber 230 can also be increased to a certain level or more.

Here, as shown in FIG. 12, when the liquid L in the main liquid chamber 214 flows toward the subsidiary liquid chamber 215 through the communication chamber 230, the case in which the flow velocity of the liquid L is increased as described will be described. In this case, the liquid L flowing into the communication chamber 230 from the first communication hole 231 flows through the communication chamber 230 in the axis O2 direction to reach the second wall surface 230b, and a flow of the liquid L is varied by the second wall surface 230b. Here, the liquid L varies the flow in the orthogonal direction along the second wall surface 230b. After that, the liquid L reaches the outer circumferential surface of the second protrusion tube 232a, and flows from the base end section toward the protrusion end section of the second protrusion tube 232a along the outer circumferential surface of the second protrusion tube 232a. Then, due to energy loss or the like caused by collision of the liquid L in which the flow is varied in this way with the liquid L flowing out of the communication chamber 230 toward the subsidiary liquid chamber 215 through the second communication hole 232, the pressure loss of the liquid L is increased and the vibrations are absorbed and attenuated. Further, as causes of the pressure loss of the liquid L, a viscous resistance of the liquid L, energy loss caused by a variation in flow of the liquid L, energy loss caused by friction between the liquid L and the second wall surface 230b, and so on, are provided. That is, when the flow velocity of the liquid L flowing through the communication chamber 230 is increased, the liquid L passes through the long path and friction occurs between the liquid L and the wall surfaces of the communication chamber 230 to cause large energy loss, and the pressure loss of the liquid L can be increased.

In addition, here, when the liquid L in the subsidiary liquid chamber 215 flows toward the main liquid chamber 214 through the communication chamber 230, as described above, the liquid L flowing into the communication chamber 230 from the second communication hole 232 flows through the communication chamber 230 in the axis O2 direction to reach the first wall surface 230a. As a result, a flow of the liquid L is varied by the first wall surface 230a such that the liquid L flows in the orthogonal direction along the first wall surface 230a. After that, the liquid L reaches the outer circumferential surface of the first protrusion tube 231a, and flows from the base end section toward the protrusion end section of the first protrusion tube 231a along the outer circumferential surface of the first protrusion tube 231a. Then, due to energy loss or the like caused by collision between the liquid L in which the flow is varied in this way and the liquid L flowing out of the communication chamber 230 toward the main liquid chamber 214 through the first communication hole 231, the pressure loss of the liquid L is increased and the vibrations are absorbed and attenuated.

In the anti-vibration apparatus 210, for example, the micro vibrations or the like having a higher frequency and significantly smaller amplitude than assumed may be unintentionally input. When the micro vibrations are input, since the flow velocity of the liquid L flowing into the communication chamber 230 is low, the pressure loss of the liquid L due to the above-mentioned collision of the liquid L is suppressed. As a result, since the liquid L passes through the communication chamber 230 to smoothly flow between the main liquid chamber 214 and the subsidiary liquid chamber 215, an increase in the dynamic spring constant is suppressed. That is, when the flow velocity of the liquid L flowing through the communication chamber 230 is low, the liquid L passes through the short path in the communication chamber 230 and occurrence of friction between the liquid L and the wall surfaces of the communication chamber 230 can be suppressed.

As described above, according to the anti-vibration apparatus according to the embodiment, as the pressure loss of the liquid L is increased according to the flow velocity of the liquid L flowing through the communication chamber 230, the vibrations can be absorbed and attenuated. Accordingly, for example, when the conventional vibrations such as idle vibrations, shake vibrations, or the like, are input, regardless of the frequency of the vibrations, the vibrations can be absorbed and attenuated. Accordingly, generation of strange noises can be suppressed while absorbing and attenuating a plurality of types of vibrations having different frequencies, and simplification of the structure and facilitation of the manufacturing can be performed.

In addition, in a state in which the flow velocity is low and the pressure loss of the liquid L is suppressed, the liquid L smoothly passes through the communication chamber 230 to suppress an increase in the dynamic spring constant. Accordingly, for example, when the flow velocity of the liquid L is lower than when the conventional vibrations are input, for example, when unintentional vibrations such as the micro vibrations or the like having a higher frequency and significantly smaller amplitude than the conventional vibrations are input, an increase in the dynamic spring constant can be suppressed. As a result, product characteristics of the anti-vibration apparatus can be easily secured.

In addition, the first communication hole 231 is formed by the inside of the first protrusion tube 231a, and the second communication hole 232 is formed by the inside of the second protrusion tube 232a. Accordingly, if the flow velocity of the liquid L flowing through the communication chamber 230 between the main liquid chamber 214 and the subsidiary liquid chamber 215 is increased, when the liquid L is directed from the main liquid chamber 214 toward the subsidiary liquid chamber 215 through the communication chamber 230 or when the liquid L is directed from the subsidiary liquid chamber 215 toward the main liquid chamber 214 through the communication chamber 230, the pressure loss of the liquid L can be increased. As a result, the vibrations can be securely absorbed and attenuated.

The outer circumferential surface of the first protrusion tube 231a has a diameter gradually reduced from the base end section toward the protrusion end section of the first protrusion tube 231a. Accordingly, when the liquid L having the increased flow velocity flows into the communication chamber 230 from the second communication hole 232, the liquid L can smoothly flows from the base end section toward the protrusion end section of the first protrusion tube 231a along the outer circumferential surface of the first protrusion tube 231a. Accordingly, the pressure loss of the liquid L can be securely increased.

Further, in the embodiment, the outer circumferential surface of the second protrusion tube 232a has a diameter gradually reduced from the base end section toward the protrusion end section of the second protrusion tube 232a. Accordingly, when the liquid L having the increased flow velocity flows into the communication chamber 230 from the first communication hole 231, the liquid L can smoothly flows from the base end section toward the protrusion end section of the second protrusion tube 232a along the outer circumferential surface of the second protrusion tube 232a. As a result, the pressure loss of the liquid L can be securely increased.

In addition, in the embodiment, since the first protrusion tube 231a and the second protrusion tube 232a overlap in the axis O2 direction, the energy loss due to collision of the liquid L can be securely increased.

Further, in the embodiment, while the outer circumferential surface of the first protrusion tube 231a has a diameter gradually reduced from the base end section toward the protrusion end section of the first protrusion tube 231a and the outer circumferential surface of the second protrusion tube 232a has a diameter gradually reduced from the base end section toward the protrusion end section of the second protrusion tube 232a, the present invention is not limited thereto. For example, the outer circumferential surface of the first protrusion tube may have the same diameter throughout the entire length of the protrusion tube, and the outer circumferential surface of the second protrusion tube may have the same diameter throughout the entire length of the second protrusion tube.

In addition, in the embodiment, while the first protrusion tube 231a and the second protrusion tube 232a overlap in the axis O2 direction, the tubes may be spaced apart from each other in the axis O2 direction.

Further, in the embodiment, while both of the first protrusion tube 231a and the second protrusion tube 232a are provided, the present invention is not limited thereto. For example, at least one of the first protrusion tube and the second protrusion tube may be provided.

In addition, in the embodiment, while the main liquid chamber 214 is formed at one side of the partition member 216 and the subsidiary liquid chamber 215 is formed at the other side, the present invention is not limited thereto. For example, the subsidiary liquid chamber serving as the first liquid chamber may be formed at the one side with respect to the partition member, and the main liquid chamber serving as the second liquid chamber may be formed at the other side.

In addition, in the embodiment, the restriction passage independent from the communication chamber 230, the first communication hole 231 and the second communication hole 232 may be formed in the partition member 216.

In addition, in the embodiment, when the unintentional vibrations such as the micro vibrations or the like are input into the anti-vibration apparatus 210, the resonant frequency of the communication holes 231 and 232 may be set such that the resonance occurs in the communication holes 231 and 232.

In addition, in the embodiment, the inside of the communication holes 231 and 232 may be closed by a film body elastically deformed by the liquid pressure of the liquid, for example, an elastic thin film or the like. Even in this case, as the liquid pressure of the liquid disposed at both sides with the film body sandwiched therebetween is transmitted via the film body, the liquid L flows through the communication holes 231 and 232.

Further, the technical spirit of the present invention is not limited to the embodiments but various modifications may be made without departing from the spirit of the present invention.

In the embodiments, while the partition members 16, 116 and 216 partition the liquid chambers in the first attachment members 11, 111 and 211 into the main liquid chambers 14, 114 and 214, and the subsidiary liquid chambers 15, 115 and 215 having the elastic bodies 13, 113 and 213 as portions of the wall surfaces, the present invention is not limited thereto. For example, instead of providing the diaphragm, a pair of elastic bodies may be provided in the axial direction, and instead of providing the subsidiary liquid chamber, a pressure receiving liquid chamber having the elastic body at a portion of the wall surface may be provided.

That is, the anti-vibration apparatus may be appropriately modified as another configuration which its partition member partitions the liquid chamber in the first attachment member in which the liquid is sealed into the first liquid chamber and the second liquid chamber, and at least one of the first liquid chamber and the second liquid chamber has an elastic body at a portion of the wall surface.

In addition, in the embodiments, while the engine is connected to the second attachment members 12, 112 and 212, and the first attachment members 11, 111 and 211 are connected to the vehicle body, they may be inversely connected.

Further, the anti-vibration apparatuses 10, 110 and 210 according to the embodiment are not limited to the engine mount of the vehicle but may be applied to an element other than the engine mount. For example, the present invention may also be applied to a mount of a generator installed at a construction machine, or may also be applied to a mount of a vehicle installed in a plant.

In addition, the components of the embodiments may be appropriately substituted with known components without departing from the spirit of the present invention, and the above-mentioned variants may be appropriately combined with each other.

INDUSTRIAL APPLICABILITY

In the anti-vibration apparatus, generation of strange noises can be suppressed while product characteristics are secured, and simplification of the structure and facilitation of the manufacturing can be accomplished.

REFERENCE SIGNS LIST 10, 40, 110, 210 anti-vibration apparatus
11, 111, 211 first attachment member
12, 112, 212 second attachment member
13, 113, 213 elastic body
14, 114, 214 main liquid chamber (first liquid chamber)
15, 115, 215 subsidiary liquid chamber (second liquid chamber)
16, 116, 216 partition member
131a first opening (first opening section)
131b second opening (second opening section)
132a first communication hole (second opening section)
132b second communication hole (first opening section)
133a first vortex chamber (intermediate chamber)
133b second vortex chamber (intermediate chamber)
134a first rectification path (first communication path)
134b second rectification path (second communication path)
135 communication path (first communication path, second communication path)
230 communication chamber (intermediate chamber)
231 first communication hole (first communication path)
232 second communication hole (second communication path)
L liquid
L1, L2 opening axis

The invention claimed is:
1. An anti-vibration apparatus comprising:
a first attachment member having a tubular shape and connected to one of a vibration generating section and a vibration receiving section, and a second attachment member connected to the other section;
an elastic body configured to connect the attachment members to each other; and
a partition member configured to partition a liquid chamber in the first attachment member in which a liquid is sealed into a first liquid chamber and a second liquid chamber,
wherein:
at least one of the first liquid chamber and the second liquid chamber has the elastic body at a portion of a wall surface of the at least one of the first liquid chamber and the second liquid chamber,
an intermediate chamber is disposed in the partition member,
the intermediate chamber has a conical shape and comprises:
a first communication path configured to bring the intermediate chamber and the first liquid chamber in communication with each other, the first communication path connected to a first side of the intermediate chamber in an axial direction of the first attachment member; and
a second communication path formed at the partition member and configured to bring the intermediate chamber and the second liquid chamber in communication with each other, the second communication path connected to a second side opposite to the first side of the intermediate chamber in the axial direction,
the first communication path includes a first opening section opening to the intermediate chamber and the second communication path includes a second opening section opening to the intermediate chamber,
an axis of the first opening section of the first communication path and an axis of the second opening section of the second communication path are offset from each other in a radial direction of the first attachment member, a flow path cross-sectional area of the intermediate chamber is gradually reduced from the first side toward the second side in the axial direction, and the intermediate chamber is a single converging chamber along the axial direction, the first opening section opens to part of a wall surface at the first side of the intermediate chamber such that, when a flow velocity of the liquid is high, a flow of the liquid in the intermediate chamber forms a spiral shape on an inner circumferential surface of the intermediate chamber, and such that, when the flow velocity of the liquid is low, the liquid flows in the intermediate chamber without forming the spiral shape on the inner circumferential surface of the intermediate chamber.

2. The anti-vibration apparatus according to claim 1, wherein the first opening section is opened facing an inner circumferential surface of the intermediate chamber, and an end section of the second side in the axial direction of the intermediate chamber is directly connected to the second communication path.

3. The anti-vibration apparatus according to claim 1, wherein the second communication path extends in a linear direction.

4. The anti-vibration apparatus according to claim 1, wherein the second communication path is disposed coaxially with a common axis of the first attachment, the second attachment and the elastic member.

5. The anti-vibration apparatus according to claim 1, wherein the first communication path extends in a direction inclined with respect to a common axis of the first attachment, the second attachment and the elastic member.

6. The anti-vibration apparatus according to claim 1,
wherein the first opening section is opened facing an inner converging circumferential surface of the intermediate chamber, wherein an end section of the second side in the axial direction of the intermediate chamber is directly connected to the second communication path, and wherein, at the end section of the second side in the axial direction of the intermediate chamber, the flow path cross-sectional area of the intermediate chamber is equal to a cross sectional area of the second opening section.

7. The anti-vibration apparatus according to claim 1,
wherein the first opening section is opened facing an inner converging circumferential surface of the intermediate chamber;

wherein an end section of the other side in the axial direction of the intermediate chamber is directly connected to the second communication path; and wherein, in a cross-sectional view which is parallel to the axial direction of the first attachment member, the circumferential surface is inclined with respect to the axial direction of the first attachment member over an entire axial length.

8. The anti-vibration apparatus according to claim 1,
wherein the first opening section and the second opening section permanently open to the intermediate chamber.

\* \* \* \* \*